(12) United States Patent
Sakai

(10) Patent No.: US 9,993,883 B2
(45) Date of Patent: Jun. 12, 2018

(54) MULTI-FLUTE BALL END MILL

(71) Applicant: Mitsubishi Hitachi Tool Engineering, Ltd., Tokyo (JP)

(72) Inventor: Shinjiroh Sakai, Yasu (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 355 days.

(21) Appl. No.: 14/910,328

(22) PCT Filed: Aug. 6, 2014

(86) PCT No.: PCT/JP2014/070796
§ 371 (c)(1),
(2) Date: Feb. 5, 2016

(87) PCT Pub. No.: WO2015/020118
PCT Pub. Date: Feb. 12, 2015

(65) Prior Publication Data
US 2016/0175948 A1    Jun. 23, 2016

(30) Foreign Application Priority Data

Aug. 6, 2013 (JP) .................................. 2013-163197
Sep. 21, 2013 (JP) .................................. 2013-196269

(51) Int. Cl.
*B23C 5/10*    (2006.01)

(52) U.S. Cl.
CPC .... *B23C 5/1009* (2013.01); *B23C 2210/0428* (2013.01); *B23C 2210/0435* (2013.01);
(Continued)

(58) Field of Classification Search
CPC .... B23C 2210/0435; B23C 2210/0457; B23C 2210/0485; B23C 2210/202;
(Continued)

(56) References Cited

U.S. PATENT DOCUMENTS

| | | | |
|---|---|---|---|
| 5,094,573 A * | 3/1992 | Hougen | B23B 51/0406 407/53 |
| 6,899,494 B2 * | 5/2005 | Walrath | B23C 5/10 407/54 |

(Continued)

FOREIGN PATENT DOCUMENTS

| | | |
|---|---|---|
| EP | 2 184 125 A1 | 5/2010 |
| JP | 06-218611 A | 8/1994 |

(Continued)

OTHER PUBLICATIONS

International Search Report of PCT/JP2014/070796 dated Oct. 28, 2014.

*Primary Examiner* — Sara Addisu
(74) *Attorney, Agent, or Firm* — Sughrue Mion, PLLC

(57) ABSTRACT

A multi-flute ball end mill comprising a shank portion, a cutting edge portion having a ball-shaped tip portion, and 3 or more cutting edges formed in the cutting edge portion; each cutting edge being constituted by a peripheral cutting edge having a twist angle η of 35-45°, and a ball-end cutting edge having a twist angle μ at the outermost peripheral point, the twist angle η and the twist angle μ meeting the relation of η−μ≤7°, such that the ball-end cutting edge is smoothly connected to the peripheral cutting edge; the ball-end cutting edge having a radial rake angle of −37° to −11°; the peripheral cutting edge having a radial rake angle of 2-8°; and a center-lowered, inclined cutting edge integrally extending from a tip end of each ball-end cutting edge to a rotation center point, in a tip end portion of the ball portion near the rotation center point.

13 Claims, 21 Drawing Sheets

(52) U.S. Cl.
CPC ........... *B23C 2210/0457* (2013.01); *B23C 2210/0485* (2013.01); *B23C 2210/202* (2013.01); *B23C 2210/203* (2013.01); *B23C 2210/204* (2013.01); *B23C 2210/205* (2013.01); *B23C 2210/40* (2013.01); *B23C 2210/54* (2013.01)

(58) Field of Classification Search
CPC ........ B23C 2210/203; B23C 2210/204; B23C 2210/205; B23C 2210/40; B23C 2210/54; B23C 5/1009; B23C 2210/0428
See application file for complete search history.

(56) References Cited

U.S. PATENT DOCUMENTS

| | | | | |
|---|---|---|---|---|
| 7,402,004 | B2* | 7/2008 | Tanaka | B23C 5/10 407/53 |
| 8,690,492 | B2* | 4/2014 | Azegami | B23C 5/1009 407/53 |
| 8,870,498 | B2 | 10/2014 | Maeda et al. | |
| 2003/0198525 | A1* | 10/2003 | Iwamoto | B23C 5/1009 407/54 |
| 2011/0211922 | A1 | 9/2011 | Maeda et al. | |
| 2012/0039677 | A1* | 2/2012 | Davis | B23C 5/10 407/54 |
| 2015/0043980 | A1* | 2/2015 | Matsumoto | B23C 5/1009 407/54 |
| 2016/0175948 | A1* | 6/2016 | Sakai | B23C 5/1009 407/54 |
| 2017/0282261 | A1* | 10/2017 | Sakai | B23C 5/1009 |

FOREIGN PATENT DOCUMENTS

| | | | | |
|---|---|---|---|---|
| JP | 06218611 A | * | 8/1994 | .......... B23C 5/1009 |
| JP | 07-20211 U | | 4/1995 | |
| JP | 09-267211 A | | 10/1997 | |
| JP | 2002-187011 A | | 7/2002 | |
| JP | 2004-181563 A | | 7/2004 | |
| JP | 2005-224898 A | | 8/2005 | |
| JP | 2006-015419 A | | 1/2006 | |
| JP | 2008-049404 A | | 3/2008 | |
| JP | 2009-056559 A | | 3/2009 | |
| JP | 2010-105093 A | | 5/2010 | |
| JP | 2010-214500 A | | 9/2010 | |
| JP | WO 2013137021 A1 | * | 9/2013 | ............... B23C 5/28 |

* cited by examiner

MULTI-FLUTE BALL END MILL

CROSS REFERENCE TO RELATED APPLICATIONS

This is a National Stage of International Application No. PCT/JP2014/070796 filed Aug. 6, 2014 (claiming priority based on Japanese Patent Application No. 2013-163197 filed Aug. 6, 2013 and Japanese Patent Application No. 2013-196269 filed Sep. 21, 2013), the contents of which are incorporated herein by reference in their entirety.

FIELD OF THE INVENTION

The present invention relates to a multi-flute ball end mill having a long life with little chipping and breakage, even in high-feed roughing of a high-hardness, difficult-to-cut material such as hardened steel, etc. used for various dies.

BACKGROUND OF THE INVENTION

As long-life ball end mills capable of efficiently cutting high-hardness dies used for the production of various parts in automobile industries, electronic industries, etc., multi-flute ball end mills of cemented carbide having 3 or more ball-end cutting edges are widely used. In the cutting of a work by a ball end mill, however, a large load is applied to portions of ball-end cutting edges near a rotation center point, in which a rotation speed is substantially zero, thereby generating vibration. As a result, the ball-end cutting edges suffer chipping and breakage near the rotation center point. To solve this problem, various proposals have been made so far.

JP 2002-187011 A proposes, as shown in FIGS. 25 and 26, a multi-flute ball end mill having 3 or more ball-end cutting edges, in which a flank (land) of each ball-end cutting edge is thinned, and each ball-end cutting edge is notched near a rotation center point, to prevent an insufficient chip pocket near the rotation center point O. However, because a thinned portion of each ball-end cutting edge does not have an arcuate portion, a large load applied near the rotation center point O causes vibration. In addition, JP 2002-187011 A does not consider the radial rake angles and twist angles of ball-end cutting edges and peripheral cutting edges. Accordingly, when this multi-flute ball end mill is used for high-feed roughing of a high-hardness, difficult-to-cut material, chipping and breakage occur in the ball-end cutting edges and peripheral cutting edges.

JP 2009-56559 A proposes a ball end mill having 2 or more ball-end cutting edges, and grooves each having a V-shaped or U-shaped cross section and formed between the ball-end cutting edges near a rotation center point, thereby well discharging chips from a tool center portion even in high-efficiency cutting. However, because this ball end mill does not have cutting edges near the rotation center point, it suffers vibration due to a large load applied near the rotation center point. Further, JP 2009-56559 A does not consider the radial rake angles and twist angles of ball-end cutting edges and peripheral cutting edges. Accordingly, when this multi-flute ball end mill is used for high-feed roughing of a high-hardness, difficult-to-cut material, chipping and breakage occur in the ball-end cutting edges and peripheral cutting edges.

JP 9-267211 A discloses a two-flute ball end mill suitable for high-speed cutting of dies, etc., which has V-shaped bottom cutting edges each having an inclination angle (center-recessed, inclined angle) of 4° or more in nose portions of the ball-end cutting edges. However, because ball-end cutting edges and peripheral cutting edges have small twist angles, chipping and breakage cannot be sufficiently prevented in high-feed roughing of a high-hardness, difficult-to-cut material.

JP 2010-105093 A discloses an end mill comprising ball-end cutting edges each having a rake angle of −10° to 0° (0° or negative near an outer end), and peripheral cutting edges each having a positive rake angle, a rake face of each ball-end cutting edge entering a rake face of each peripheral cutting edge. However, because this ball end mill does not have center-lowered, inclined cutting edges, the clogging of chips occurs near the rotation center point in high-feed roughing of a high-hardness, difficult-to-cut material. Also, because the ball-end cutting edges and the peripheral cutting edges have small twist angles, chipping and breakage cannot be sufficiently prevented in high-feed roughing of a high-hardness, difficult-to-cut material.

JP 2006-15419 A discloses a ball end mill having substantially quarter-circular bottom cutting edges (ball-end cutting edges) and peripheral cutting edges, which have substantially the same radial rake angle in their connection points. JP 2006-15419 A describes that with such a shape, the cutting edges have strength not largely variable in their connection points, thereby avoiding cracking and chipping due to the concentration of a cutting load even when the ball end mill is used for cutting to their connection points. However, JP 2006-15419 A does not consider the radial rake angles and twist angles of ball-end cutting edges and peripheral cutting edges. Also, because a rake face of each peripheral cutting edge largely enters a rake face of each ball-end cutting edge, with each ball-end cutting edge not having a convex rake face, each ball-end cutting edge of this ball end mill has insufficient rigidity and strength. Accordingly, when this multi-flute ball end mill is used for high-feed roughing of a high-hardness, difficult-to-cut material, chipping and breakage occur in the ball-end cutting edges and peripheral cutting edges.

OBJECT OF THE INVENTION

Accordingly, an object of the present invention is to provide a multi-flute ball end mill with effectively reduced chipping and breakage of ball-end cutting edges and peripheral cutting edges as well as suppressed vibration, while preventing the clogging of chips near the rotation center point, even in high-feed roughing of a high-hardness, difficult-to-cut material such as hardened steel, etc.

DISCLOSURE OF THE INVENTION

As a result of intensive research in view of the above object, the inventor has found that the above object can be achieved by the synergistic effects of the requirements of (a) providing each of cutting edges and peripheral cutting edges with a large twist angle at the outermost peripheral point, and making each cutting edge have as close a twist angle as possible to that of each peripheral cutting edge at the outermost peripheral point, such that each cutting edge is smoothly connected to each peripheral cutting edge; (b) providing each ball-end cutting edge with a largely negative radial rake angle, and each peripheral cutting edge with a positive radial rake angle; and (c) forming center-lowered, inclined cutting edges near a rotation center point. The present invention has been completed based on such finding.

The first multi-flute ball end mill of the present invention comprises a shank portion rotating around a rotation axis, a cutting edge portion having a ball-shaped tip portion, and 3 or more cutting edges formed in the cutting edge portion;

each cutting edge being constituted by a peripheral cutting edge having a twist angle η of 35-45°, and a ball-end cutting edge having a twist angle μ at the outermost peripheral point, the twist angle η and the twist angle μ meeting the relation of η−μ≤7°, such that the ball-end cutting edge is smoothly connected to the peripheral cutting edge;

the ball-end cutting edge having a radial rake angle of −37° to −11°, and the peripheral cutting edge having a radial rake angle of 2-8°, in a range from 0.1D to 0.4D from a connecting point of each center-lowered, inclined cutting edge and each ball-end cutting edge, wherein D is a diameter of the cutting edge portion;

the center-lowered, inclined cutting edge integrally extending from a tip end of each ball-end cutting edge to a rotation center point, in a tip end portion of the ball portion near the rotation center point; and a second concave rake face having a positive rake angle, which corresponds to a rake face of each peripheral cutting edge, entering a center portion of a first rake face having a negative rake angle, which corresponds to a rake face of each ball-end cutting edge, in a region of each ball-end cutting edge near a boundary of the ball-end cutting edge and the peripheral cutting edge, a ratio of the second rake face to the first rake face gradually increasing as nearing the boundary, with the second rake face reaching 100% at the boundary.

It is preferable that each center-lowered, inclined cutting edge has at least an arcuate portion projecting rearward in a rotation direction; that the arcuate portion has a curvature (ratio of the length of a perpendicular line extending from an apex of the arcuate portion to a line connecting both ends of the arcuate portion to the length of a line connecting both ends of the arcuate portion) of 5-40%; and that each center-lowered, inclined cutting edge is inclined with an inclination angle α of 0.5-3° relative to a plane perpendicular to the rotation axis, such that the rotation center point is positioned on the rear side of a connecting point of each center-lowered, inclined cutting edge and each ball-end cutting edge in a rotation axis direction.

In the first multi-flute ball end mill of the present invention, "the ratio of the second rake face to the first rake face" means a ratio of the length of a contour line of the second rake face to the length of a contour line of the first rake face, in FIG. 10(a), etc. described below.

To provide each ball-end cutting edge with sufficient rigidity and strength, the second multi-flute ball end mill of the present invention comprising a shank portion rotating around a rotation axis, a cutting edge portion having a ball-shaped tip portion, and 3 or more cutting edges formed in said cutting edge portion;

each cutting edge being constituted by a peripheral cutting edge having a twist angle η of 35-45°, and a ball-end cutting edge having a twist angle μ at the outermost peripheral point, the twist angle η and the twist angle μ meeting the relation of η−μ≤7°, such that the ball-end cutting edge is smoothly connected to the peripheral cutting edge;

the ball-end cutting edge having a radial rake angle of −37° to −11°, and the peripheral cutting edge having a radial rake angle of 2-8°, in a range from 0.1D to 0.4D from a connecting point of each center-lowered, inclined cutting edge and each ball-end cutting edge, wherein D is a diameter of the cutting edge portion;

the center-lowered, inclined cutting edge integrally extending from a tip end of each ball-end cutting edge to a rotation center point, in a tip end portion of the ball portion near the rotation center point; and a rake face of each ball-end cutting edge being a curved surface convexly projecting forward in a rotation direction, the curvature of the convexly curved surface (ratio of the length of a perpendicular line extending from an apex of the convexly curved surface to a line connecting both ends of the convexly curved surface to the length of the line connecting both ends of the convexly curved surface) being 1-10%.

A boundary of the first rake face and the second rake face is preferably in the form of a curved line projecting toward a tip end of each ball-end cutting edge.

To provide the ball portion with sufficient rigidity and strength, a chip-discharging groove between the ball-end cutting edges preferably has a convex bottom surface having a curvature (ratio of the length of a perpendicular line extending from an apex of the convex surface to a line connecting both ends of the convex surface to the length of the line connecting both ends of the convex surface) of 5-40%. The percentage of the convex surface portion in the bottom surface of the chip-discharging groove is preferably 50% or more.

The percentage of the radial length of the arcuate portion in each center-lowered, inclined cutting edge is preferably 20-100%. In each cutting edge, the circumferential width of a flank of each center-lowered, inclined cutting edge at a connecting point of the center-lowered, inclined cutting edge and the ball-end cutting edge is preferably 20-80% of the maximum circumferential width of a flank of each ball-end cutting edge. The radial length X (radial distance from the outer end of the ball-end cutting edge to the rotation center point) of each center-lowered, inclined cutting edge is preferably 1.25-3.75% of the diameter D of the cutting edge portion.

The ball-end cutting edges are preferably unevenly arranged circumferentially around the rotation axis.

DESCRIPTION OF THE PREFERRED EMBODIMENTS

The multi-flute ball end mill of the present invention suitable for high-feed roughing of a high-hardness, difficult-to-cut material will be explained in detail below, taking a solid-type multi-flute ball end mill of cemented carbide for example. The multi-flute ball end mill of the present invention preferably has 3-6 cutting edges. Unless otherwise mentioned, explanations of each ball end mill will be applicable to other ball end mills. Because the definitions of various parameters used herein are the same in all ball end mills, the definitions described in the column of four-flute ball end mill are applicable to other multi-flute ball end mills.

The term "high-hardness, difficult-to-cut material" used herein means, for example, a metal having Rockwell hardness HRC of 40 or more, particularly 50 or more, such as hardened tool steel (SKD61, SKD11, powder-metallized high-speed steel, etc.). The term "roughing" means machining with large cutting depth and feed under a large cutting load for high cutting efficiency, which is carried out before finishing. The term "high-feed machining" means high-efficiency machining carried out with one or more of a feed speed Vf, a longitudinal cutting depth ap and a radial cutting depth ae increased. A high-hardness, difficult-to-cut material is subjected to high-feed machining, desirably at a feed speed Vf of 1250 mm/min or more, a longitudinal cutting depth ap of 0.3 mm or more, and a radial cutting depth ae of 0.9 mm or more in the case of using a three-flute ball end mill, and at a feed speed Vf of 1500 mm/min or more, a longitudinal cutting depth ap of 0.4 mm or more, and a radial cutting depth ae of 1.2 mm or more in the case of using four-flute, five-flute and six-flute ball end mills.

A solid-type, multi-flute ball end mill of cemented carbide is produced by molding mixed powder of WC powder and Co powder in a die, sintering the resultant green body, and finish-grinding the sintered body in cutting edge portions, gashes, chip-discharging grooves, flanks, rake faces, etc. If necessary, the cutting edge portions are coated with a known wear-resistant hard film of TiSiN, TiAlN, TiAlSiN, CrN, CrSiN, AlCrN, AlCrSiN, AlTiCrN, AlCrVBN, etc.

[1] Four-Flute Ball End Mill (1) First Embodiment

Figure 1A:
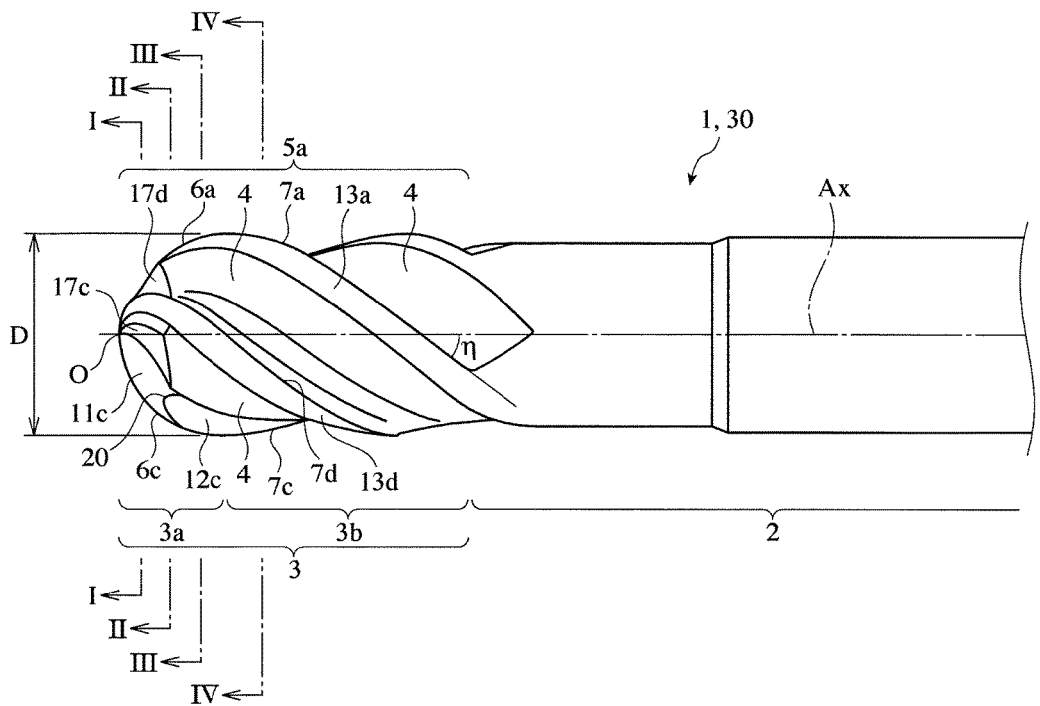
FIG. 1(a) is a side view showing the four-flute ball end mill of the present invention.
Figure 1B:
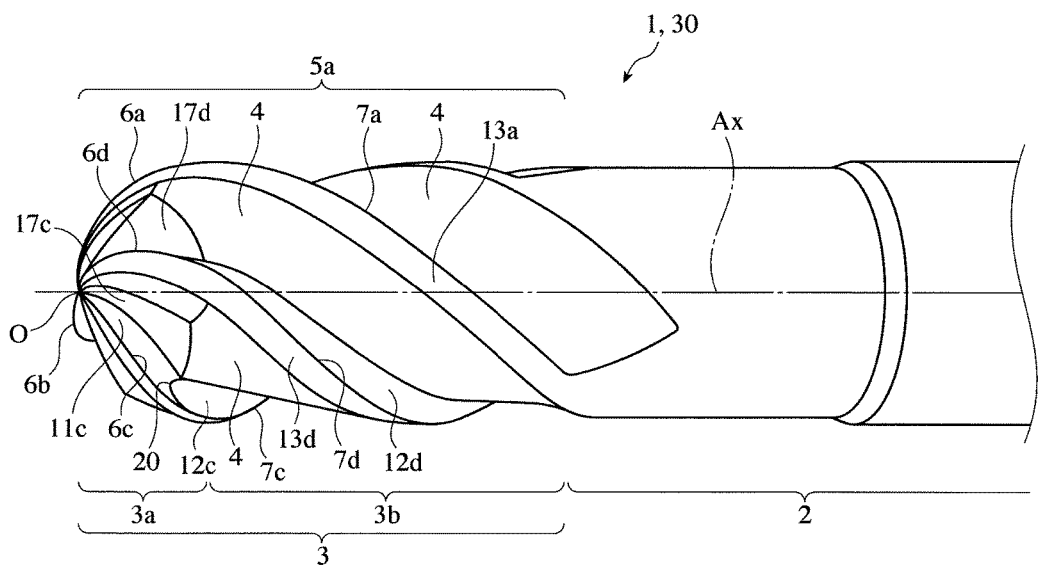
FIG. 1(b) is a perspective view showing the four-flute ball end mill of FIG. 1(a).
Figure 1C:
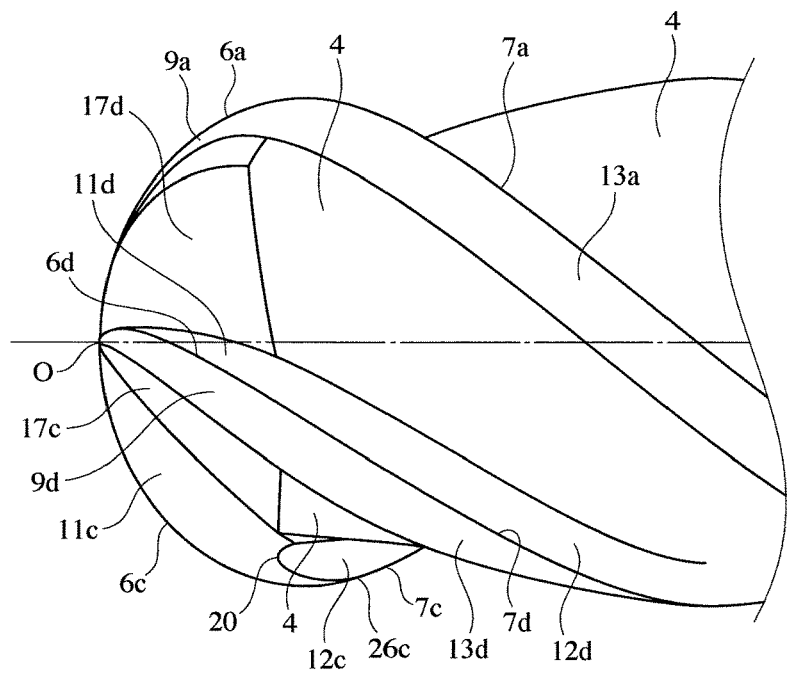
FIG. 1(c) is a partial, enlarged perspective view showing the four-flute ball end mill of FIG. 1(a).
Figure 1D:
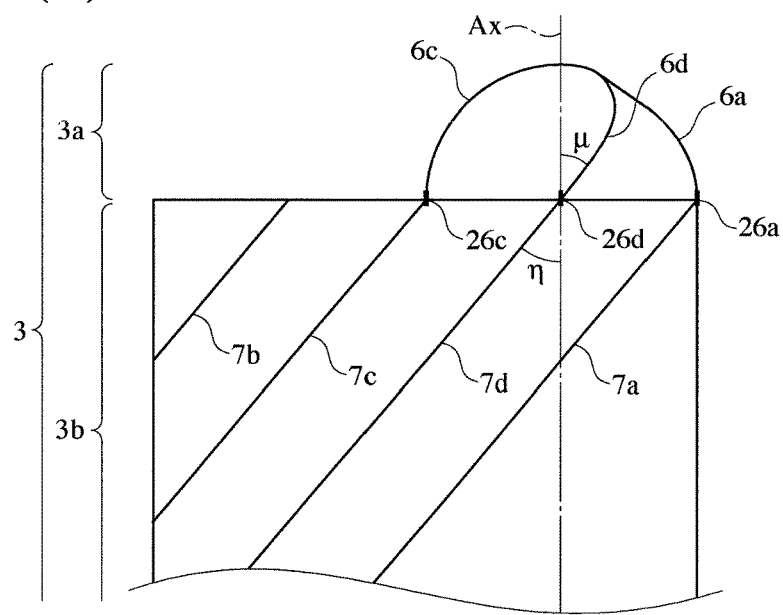
FIG. 1(d) is a partially developed side view showing the relation between the twist angle of a cutting edge and the twist angle of a peripheral cutting edge.
Figure 2:
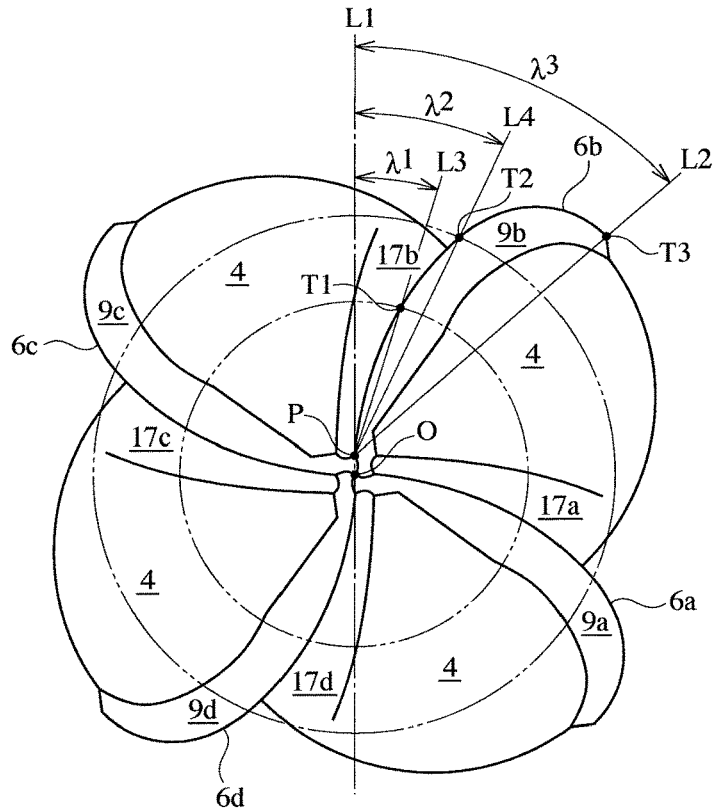
FIG. 2 is an enlarged front view showing ball-end cutting edges and chip-discharging grooves in the four-flute ball end mill having evenly arranged ball-end cutting edges according to the first embodiment of the present invention.

The four-flute ball end mill 1 according to the first embodiment of the present invention, which is shown in FIGS. 1-7, comprises a cylindrical shank portion 2, and a cutting edge portion 3, which has a tip-end ball portion 3a, and a peripheral cutting edge portion 3b between the ball portion 3a and the shank portion 2. The cutting edge portion 3 is provided with four cutting edges 5a, 5b, 5c, 5d each having a predetermined twist angle. Each cutting edge 5a-5d is constituted by a circular ball-end cutting edge 6a, 6b, 6c, 6d formed in the ball portion 3a, and a spiral peripheral cutting edge 7a, 7b, 7c, 7d formed in the peripheral cutting edge portion 3b, and each ball-end cutting edge 6a-6d is smoothly (with no inflection point) connected to each peripheral cutting edge 7a-7d. As shown in FIG. 2, four ball-end cutting edges 6a-6d are arranged via gashes 17a-17d around a rotation center point O in the ball portion 3a.

As shown in FIGS. 1(a)-1(c), each ball-end cutting edge 6a-6d has a rake face 11a, 11b, 11c, 11d on the front side in a rotation direction, and a flank (land) 9a, 9b, 9c, 9d on the rear side in a rotation direction. Each rake face 11a-11d has a gash 17a, 17b, 17c, 17d on the front side in a rotation direction, and each gash 17a-17d constitutes part of a chip-discharging groove 4. Each peripheral cutting edge 7a-7d has a rake face 12a, 12b, 12c, 12d on the front side in a rotation direction, and a flank 13a, 13b, 13c, 13d on the rear side in a rotation direction.

Figure 3:
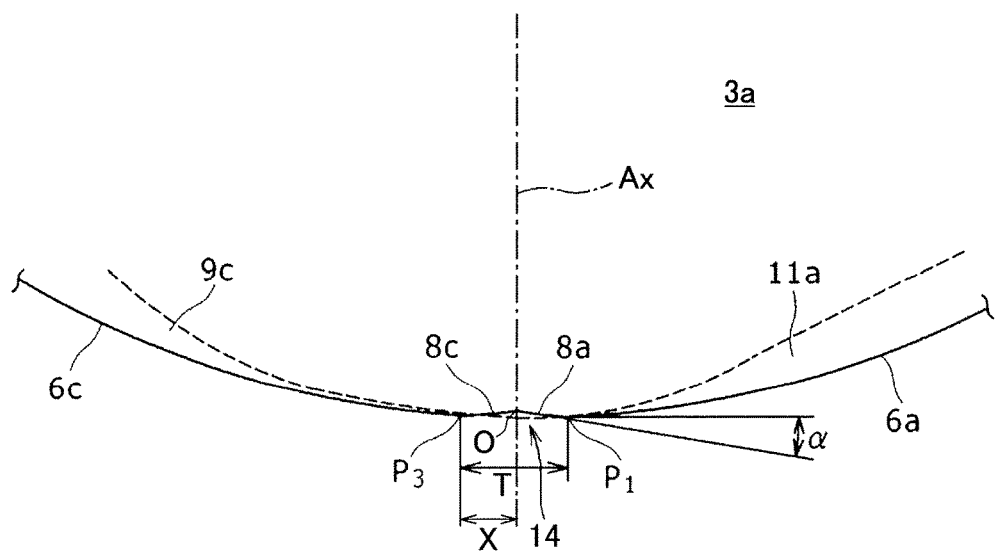
FIG. 3 is an enlarged view showing a locus of ball-end cutting edges of the four-flute ball end mill of FIG. 2.
Figure 4:
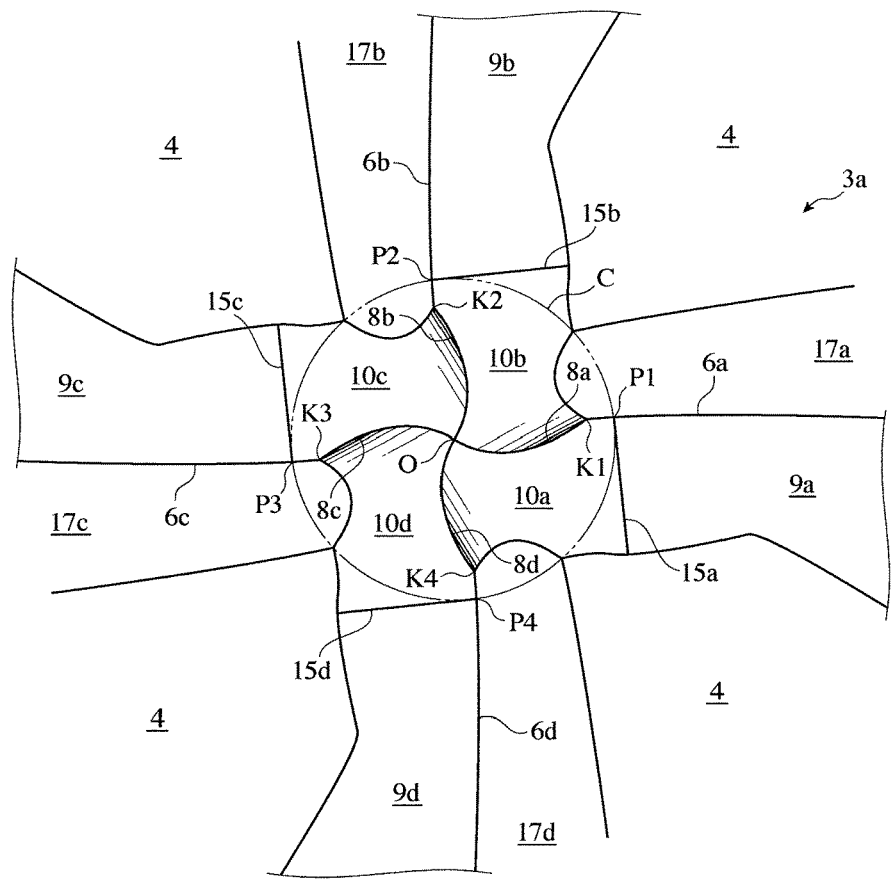
FIG. 4 is an enlarged front view showing an example of center-lowered, inclined cutting edges in the four-flute ball end mill of FIG. 2.

FIGS. 3 and 4 show part of the ball portion 3a near the rotation center point O. Each ball-end cutting edge 6a-6d (only 6a and 6c are seen in FIG. 3) extends from a periphery of the cutting edge portion 3 to a point P1, P2, P3, P4 (only P1 and P3 are seen in FIG. 3) near the rotation center point O. The center-lowered, inclined cutting edges 8a, 8b, 8c, 8d extend between the points P1-P4 and the rotation center point O. Accordingly, each point P1-P4 is called a tip end of each ball-end cutting edge 6a-6d, an outer end of each center-lowered, inclined cutting edge 8a-8d, or a connecting point of each ball-end cutting edge 6a-6d and each center-lowered, inclined cutting edge 8a-8d. A flank 10a, 10b, 10c, 10d is formed on the rear side of each center-lowered, inclined cutting edge 8a-8d in a rotation direction. Each flank 10a-10d is connected to the corresponding ball-end cutting edge flank 9a-9d via a boundary line 15a, 15b, 15c, 15d. The center-lowered, inclined cutting edges will be explained in detail below.

Figure 5:
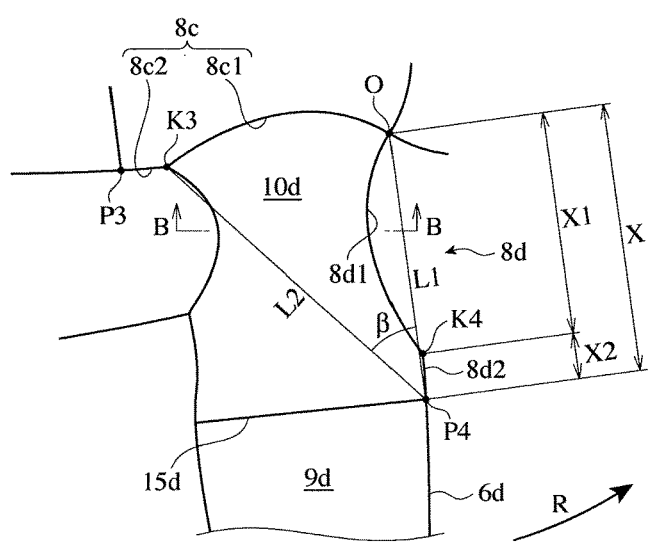
FIG. 5 is a partial, enlarged front view showing arcuate portions of center-lowered, inclined cutting edges.
Figure 6:
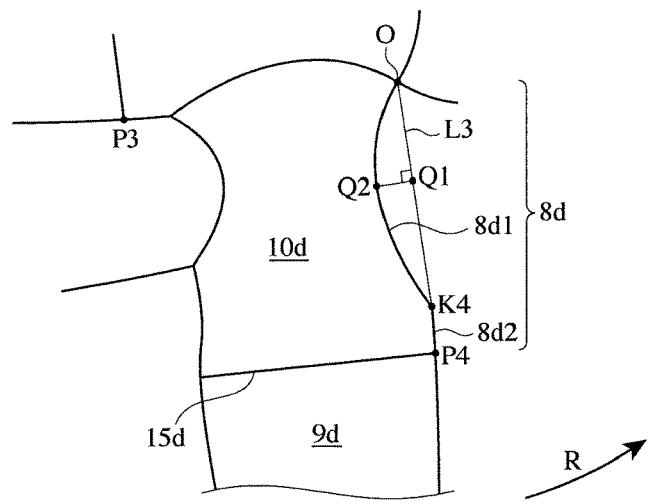
FIG. 6 is a partial, enlarged front view showing an arcuate portion of a center-lowered, inclined cutting edge.

As is clear from FIG. 4, in the four-flute ball end mill 1 according to the first embodiment of the present invention, each center-lowered, inclined cutting edge 8a-8d is constituted by an arcuate portion extending from the rotation center point O to each point K1-K4 and projecting rearward in a rotation direction, and a ball-end cutting edge extension extending from each point K1-K4 to each point P1-P4. In FIGS. 5 and 6 showing a center-lowered, inclined cutting edge 8d, the arcuate portion is represented by 8d1, and the ball-end cutting edge extension is represented by 8d2. R represents a rotation direction. The arcuate portion 8d1 of the center-lowered, inclined cutting edge 8d is obtained by forming a flank 10a for an adjacent center-lowered, inclined cutting edge 8a on the front side in a rotation direction. This is also true in other arcuate portions 8a1-8c1 and other ball-end cutting edge extensions 8a2-8c2.

The arcuate portions 8a1-8d1 may be entirely or partially curved. In the latter case, because a curved portion is smoothly connected to a straight portion, their connection cannot be accurately determined. Accordingly, the curved portion plus the straight portion is called "arcuate portion," regardless of whether it is entirely or partially occupied by the curved portion.

However, the ball-end cutting edge extension 8d2 is not indispensable, but each center-lowered, inclined cutting edge 8a-8d may be constituted only by an arcuate portion curved rearward in a rotation direction. Thus, because each center-lowered, inclined cutting edge 8a-8d has at least an arcuate portion 8a1-8d1 curved or projecting rearward in a rotation direction, the center-lowered, inclined cutting edges 8a-8d can withstand a high-feed cutting load.

As shown in FIGS. 4, 5 and 6, a flank 10a of the center-lowered, inclined cutting edge 8a is in curved contact with the center-lowered, inclined cutting edge 8d on the rear side in a rotation direction, to from an arcuate portion 8d1 of the center-lowered, inclined cutting edge 8d, and a rotation-direction rear side of the flank 10a is connected to the gash 17d. This is also true in the flanks 10b-10d of other center-lowered, inclined cutting edges 8b-8d.

As shown in FIG. 3, each center-lowered, inclined cutting edge 8a-8d is inclined with small inclination angle α relative to a plane perpendicular to the rotation axis Ax, with the rotation center point O being the rearmost point in a rotation axis direction. Thus, the center-lowered, inclined cutting edges 8a-8d inside the tip ends P1-P4 of the ball-end cutting edges 6a-6d form an extremely shallow recess 14 having a small width T. As shown in FIG. 4, the recess 14 is expressed by a circle C having a center at the rotation center point O and passing the connecting points P1-P4 of the center-lowered, inclined cutting edges 8a-8d and the ball-end cutting edges 6a-6d.

The inclination angle α of each center-lowered, inclined cutting edge 8a-8d is preferably 0.5-3°. When the inclination angle α is more than 3°, premature wearing and chipping are likely to occur in the cutting edges near the points P1-P4 (end portions of the ball-end cutting edges 6a-6d and the center-lowered, inclined cutting edges 8a-8d), due to a load applied by cutting with the center-lowered, inclined cutting edges 8a-8d. On the other hand, when the inclination angle α is less than 0.5°, the center-lowered, inclined cutting edges 8a-8d near the rotation center point O easily come into contact with a work, losing the cutting-resistance-reducing effect of the center-lowered, inclined cutting edges 8a-8d. The inclination angle α is more preferably 1-2°. Because each center-lowered, inclined cutting edge 8a-8d is inclined with a small inclination angle rearward in a rotation axis direction, vibration can be suppressed in high-feed cutting.

The radial length X of each center-lowered, inclined cutting edge 8a-8d is preferably 1.25-3.75% of the diameter D (FIG. 1) of the cutting edge portion 3. The radial length X of each center-lowered, inclined cutting edge 8a-8d is a radial distance between an outer end P1-P4 connected to each ball-end cutting edge 6a-6d and the rotation center point O, equal to the distance between the outer end P1-P4 and the rotation center point O when viewed in a front view of the cutting edge portion 3. As shown in FIG. 3, the radial length X of each center-lowered, inclined cutting edge 8a-8d (radial distance between an outer end P1-P4 connected to each ball-end cutting edge 6a-6d and the rotation center point O) is a half of the width T of a recess 14. For example, when the diameter D is 8 mm, the width T of the recess 14 is set in a range of 0.2-0.6 mm.

With the radial length X of the center-lowered, inclined cutting edges 8a-8d being 1.25-3.75% of the diameter D of the cutting edge portion 3, the inclination angle α of the center-lowered, inclined cutting edges at the rotation center point O and its vicinity, at which a cutting speed is 0, can be kept in a range of 0.5-3°, while securing enough length to the ball-end cutting edges, thereby enabling high-efficiency roughing. When the radial length X of each center-lowered, inclined cutting edge 8a-8d is less than 1.25% of the diameter D of the cutting edge portion 3, each center-lowered, inclined cutting edge 8a-8d has too large an inclination angle α, so that the center-lowered, inclined cutting edges 8a-8d cannot be formed easily. On the other hand, when the radial length X of each center-lowered, inclined cutting edge 8a-8d is more than 3.75% of the diameter D of the cutting edge portion, the ball-end cutting edges 6a-6d are too short relative to the center-lowered, inclined cutting edges 8a-8d, failing to achieve high-efficiency, high-feed cutting. The radial length X of each center-lowered, inclined cutting edge 8a-8d is more preferably 1.5-3.5% of the diameter D of the cutting edge portion 3. Though not particularly restrictive, the diameter D is preferably 0.1-30 mm, more preferably 0.5-20 mm, from a practical point of view.

As shown in FIG. 5, in the four-flute ball end mill 1 according to the first embodiment of the present invention, each center-lowered, inclined cutting edge 8d is constituted by an arcuate portion 8d1 extending from the rotation center point O to the point K4, and a ball-end cutting edge extension 8d2 extending from the point K4 to the outer end P4. Accordingly, the radial length X of each center-lowered, inclined cutting edge 8d is a total of the radial length X1 of the arcuate portion 8d1 and the radial length X2 of the ball-end cutting edge extension 8d2. In this example, the ball-end cutting edge extension 8d2 may be straight or curved. This is also true in the other center-lowered, inclined cutting edges 8a-8c. The radial length X1 of each arcuate portion is preferably 20-100%, more preferably 30-100%, most preferably 60-95%, of the radial length X of each center-lowered, inclined cutting edge 8a-8d. When X1 is less than 20% of X, the center-lowered, inclined cutting edges 8a-8d undergo large cutting resistance.

As shown in FIG. 6, when a perpendicular line extending from a point Q1 on a straight line L3 connecting both ends O, K4 of the arcuate portion 8d1 passes a point Q2 on the arcuate portion 8d1, the position of the point Q1 is determined such that a line Q1-Q2 has the maximum length. When the line Q1-Q2 has the maximum length, a ratio of the length of the line Q1-Q2 to the length of the straight line L3 is regarded as a curvature of the arcuate portion 8d1 of the center-lowered, inclined cutting edge 8d. The ratio of the length of the line Q1-Q2 to the length of the straight line L3, which is defined as curvature, is preferably 5-40%, more preferably 8-35%. When the curvature of the arcuate portion 8d1 is less than 5%, a chip pocket is too small. On the other hand, when it exceeds 40%, the center-lowered, inclined cutting edges have insufficient rigidity.

A recess 14 having a small width T, which is formed near the rotation center point O of the ball portion 3a, is connected to gashes 17a-17d to act as a chip pocket at a tip end of the cutting edge portion 3. Extremely thin chips generated by the center-lowered, inclined cutting edges 8a-8d are discharged from the recess 14 to the chip-discharging grooves 4 via gashes 17a-17d, thereby preventing the clogging of chips near the rotation center point O even in high-feed cutting.

Figure 7:
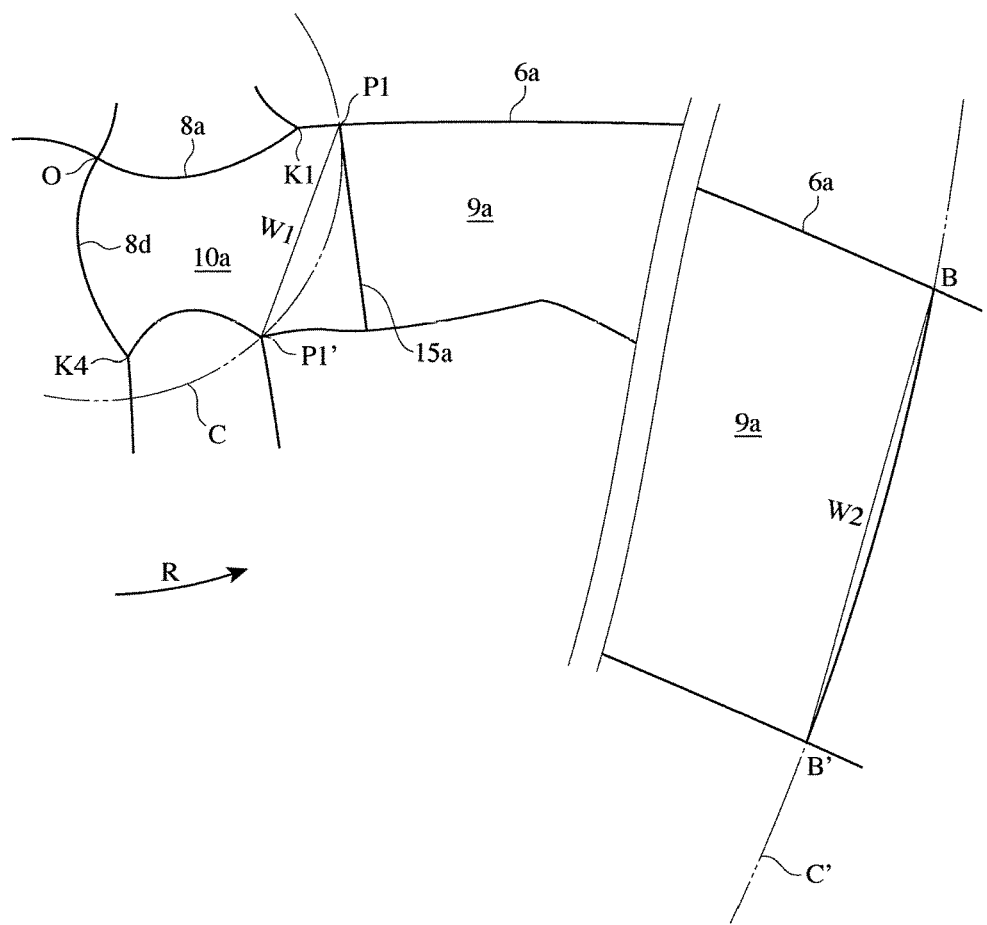
FIG. 7 is a partial, enlarged front view showing the circumferential width of a flank of a center-lowered, inclined cutting edge.

The width of a flank 10a-10d of each center-lowered, inclined cutting edge varies between its boundary line 15a-15d with a flank 9a-9d of each ball-end cutting edge and the rotation center point O. Thus, the width of the flank 10a-10d is evaluated by the following method. As shown in FIG. 7, the circumferential width W1 of a flank 10a of a center-lowered, inclined cutting edge 8a at the point P1 is preferably 20-80%, more preferably 30-70%, of the maximum circumferential width W2 of the flank 9a of the ball-end cutting edge 6a. With this requirement met, the center-lowered, inclined cutting edges can surely have high rigidity. The circumferential width W1 of the flank 10a of the center-lowered, inclined cutting edge 8a at the point P1 is the length of a straight line connecting points P1, P1', at which a circle C having its center at the rotation center point O and passing the point P1 crosses the flank 10a. The maximum circumferential width W2 of the flank 9a of the ball-end cutting edge 6a is the length of a straight line connecting points B, B', at which a circle C' having its center at the rotation center point O crosses the flank 9a of the ball-end cutting edge 6a. The radius of the circle C' is determined to have the longest straight line B-B'.

When the width of the flank 10a-10d is evaluated relative to the radial length X of each center-lowered, inclined cutting edge 8a-8d, a center angle β of the arcuate portion 8a1-8d1 of each center-lowered, inclined cutting edge 8a-8d is used. As shown in FIG. 5, the center angle β of the arcuate portion 8a1-8d1 is an angle between straight lines L1 and L2 respectively connecting both ends O and K3 of the arcuate portion 8c1 of the center-lowered, inclined cutting edge 8c formed by the flank 10d of the center-lowered, inclined cutting edge 8d to the point P4.

The center angler β of the arcuate portion of each center-lowered, inclined cutting edge is preferably 20-70°. When the center angle β is less than 20°, the flank 10a-10d of each center-lowered, inclined cutting edge 8a-8d has too small width, failing to obtain sufficient rigidity to cutting resistance. On the other hand, it is difficult to form each center-lowered, inclined cutting edge 8a-8d having a center angle β of more than 70°, while meeting the requirement that the radial length X of each center-lowered, inclined cutting edge 8a-8d is 1.25-3.75% of the edge diameter D of the cutting edge portion 3. The center angle β is more preferably 30-60°, most preferably 40-48°.

As described above, because each center-lowered, inclined cutting edge 8a-8d has at least an arcuate portion curved rearward in a rotation direction, and because each flank 10a-10d has sufficient width, it has sufficient rigidity. Accordingly, in high-feed roughing of a work, the chipping and breakage of the center-lowered, inclined cutting edges 8a-8d can be effectively prevented.

The radial rake angle (rake angle in a direction perpendicular to the rotation axis Ax) of each center-lowered, inclined cutting edge 8a-8d is −37° to −11°, preferably −33° to −15°. This provides sufficient rigidity and strength. The radial rake angle of less than −37° provides too large cutting resistance, and the radial rake angle of more than −11° provides the edge with reduced rigidity and strength.

Both of the flanks 9a-9d of the ball-end cutting edges 6a-6d and the flanks 10a-10d of the center-lowered, inclined cutting edges 8a-8d preferably have clearance angles within 7-21°. When both clearance angles are less than 7°, vibration is likely to occur in high-efficiency cutting because of high cutting resistance. On the other hand, when both clearance angles are more than 21°, the ball-end cutting edges and the center-lowered, inclined cutting edges have low rigidity despite reduced cutting resistance, likely resulting in chipping and breakage in high-efficiency cutting. Both of the flanks 9a-9d of the ball-end cutting edges and the flanks 10a-10d of the center-lowered, inclined cutting edges have clearance angles of more preferably 9-19°, most preferably 10-15°. Incidentally, these clearance angles are preferably substantially the same.

Thus, the multi-flute ball end mill of the present invention comprising (a) center-lowered, inclined cutting edges having arcuate portions, which are inclined rearward in a rotation axis direction relative to a plane perpendicular to the rotation axis with an inclination angle α of 0.5-3°; and (b) ball-end cutting edges having convex rake faces and chip-discharging grooves having convex bottom surfaces as in the second embodiment of the present invention described below, can carry out extremely stable cutting, while effectively preventing chipping and breakage in the ball-end cutting edges and the center-lowered, inclined cutting edges, even in high-efficiency roughing of a high-hardness, difficult-to-cut material.

(2) Second Embodiment

Figure 8A:
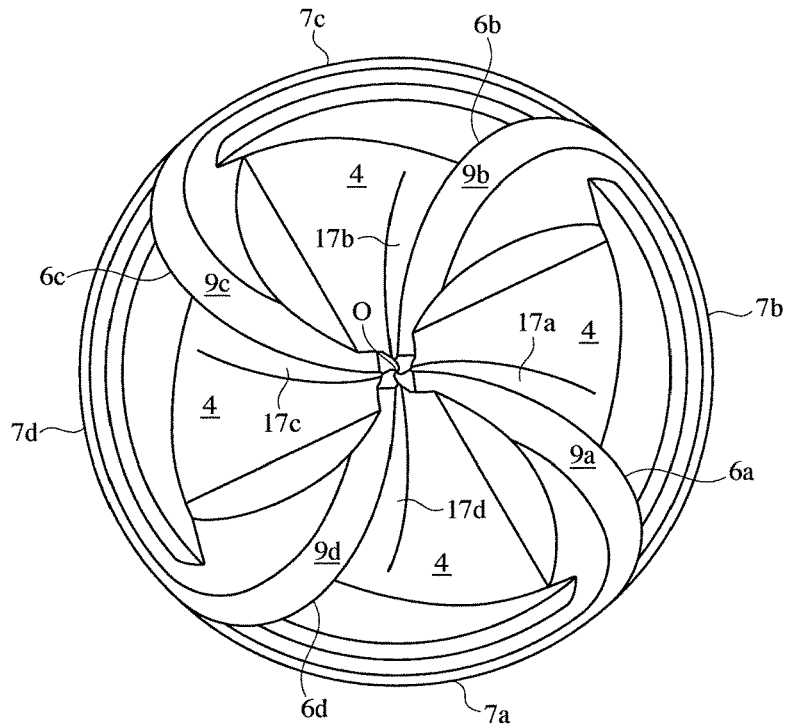
FIG. 8(a) is an enlarged front view showing a ball portion of the four-flute ball end mill having unevenly arranged ball-end cutting edges according to the second embodiment of the present invention.
Figure 8B:
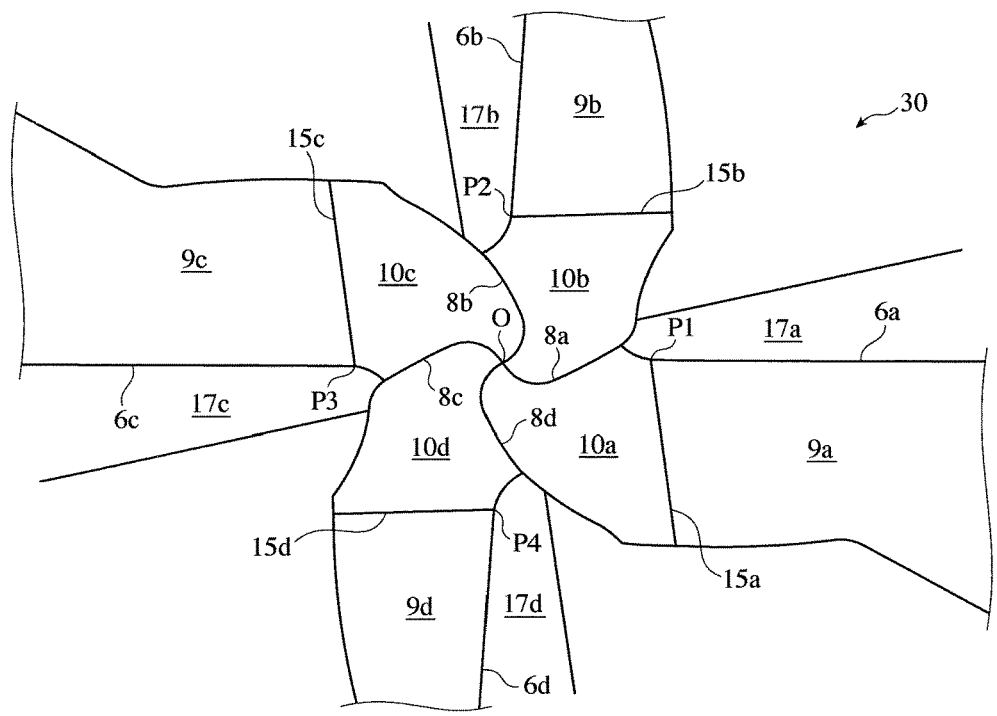
FIG. 8(b) is a partial, enlarged front view showing the center-lowered, inclined cutting edges of the four-flute ball end mill in FIG. 8(a).

As shown in FIGS. 8(a) and 8(b), the four-flute ball end mill 30 according to the second embodiment of the present invention is substantially the same as the four-flute ball end mill 1 in the first embodiment, except for the shape of each center-lowered, inclined cutting edge and the uneven arrangement of ball-end cutting edges. In FIG. 8, the same reference numerals are assigned to the same portions as in the first embodiment. These differences will be explained in detail below.

Figure 9:
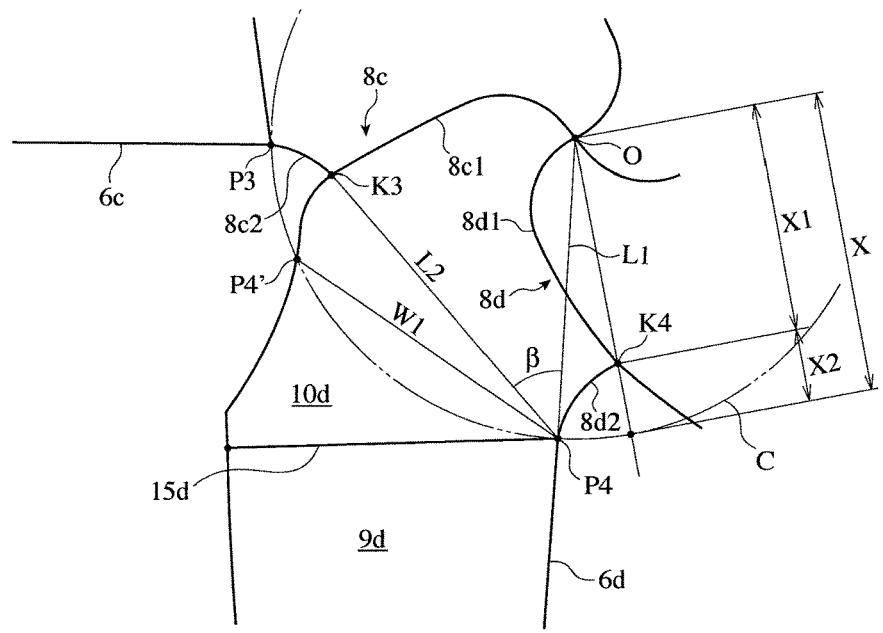
FIG. 9 is an enlarged front view showing part of a center-lowered, inclined cutting edge in FIG. 8(b).

FIG. 9 enlargedly shows part of FIG. 8(b). An arcuate portion 8c1 obtained by the formation of a flank 10d extends between a rotation center point O and a point K3, and a curved extension 8c2 extending radially inward from a ball-end cutting edge 6c is connected to the arcuate portion 8c1 at the point K3. The point K3 is an inflection point between the arcuate portion 8c1 and the curve portion 8c2.

In the example shown in FIG. 9, too, the circumferential width W1 of a flank 10d of a center-lowered, inclined cutting edge 8d at a point P4 is preferably 20-80%, more preferably 30-70%, of the maximum circumferential width W2 of a flank 9a of a ball-end cutting edge 6d, as in the first embodiment. The center angle β of the arcuate portion 8c1 of a center-lowered, inclined cutting edge 8c obtained by the formation of a flank 10d of a center-lowered, inclined cutting edge 8d is an angle between straight lines L1, L2 connecting both ends O and K3 of the arcuate portion 8c1 to the point P4. The center angle β of this arcuate portion is preferably 20-70°, more preferably 30-60°, most preferably 40-48°, as in the first embodiment.

Even when the arcuate portion 8c1 and the ball-end cutting edge extension 8c2 constituting the center-lowered, inclined cutting edge 8c are connected via the inflection point K3, the same effects as in the first embodiment can be obtained, by meeting the requirements of the present invention that each center-lowered, inclined cutting edge is inclined rearward in a rotation axis direction relative to a plane perpendicular to the rotation axis with an inclination angle α of 0.5-3°, and that the rake face of each ball-end cutting edge and the bottom surface of each chip-discharging groove comprises a convexly curved surface as described below.

Because ball-end cutting edges are unevenly arranged in the second embodiment, the ball-end cutting edges 6a-6d have different rotational positions and widths, with different center-lowered, inclined cutting edges 8a-8d and flanks 10a-10d. With such unevenly arranged ball-end cutting edges, vibration is further suppressed in high-feed roughing of a high-hardness, difficult-to-cut material. The dividing angle (angle of circumferentially arranging four ball-end cutting edges) in the uneven arrangement is desirably 90± (2-5°). When the difference between the dividing angle and the reference angle of 90° is less than 2°, a large effect of suppressing vibration cannot be obtained. On the other hand, when the difference between the dividing angle and the reference angle of 90° is more than 5°, too uneven load is applied to ball-end cutting edges, likely suffering increased chipping and breakage.

(3) Shapes of Cutting Edge, Peripheral Cutting Edges and Chip-Discharging Grooves Because there is no difference between the first and second embodiments in the shapes of cutting edges, peripheral cutting edges and chip-discharging grooves, they will be explained in detail below, taking the four-flute ball end mill in the second embodiment for example.

(a) Twist Angles of Ball-End Cutting Edges and Peripheral Cutting Edges

To have a long life with little chipping and breakage even in high-feed roughing of a high-hardness, difficult-to-cut material, each peripheral cutting edge 7a-7d should have a twist angle η of 35-45° (for example, η=40°), and each ball-end cutting edge 6a-6d should have a twist angle μ (for example, μ=) 36° meeting the relation of η−μ≤7° to the twist angle η, so that both cutting edges are smoothly connected. Unless otherwise mentioned, the "twist angle μ" of each ball-end cutting edge is a twist angle of each ball-end cutting edge at the outermost peripheral point. The "twist angle at the outermost peripheral point" is a twist angle measured within 0.02D from the outer end 26a-26d of each ball-end cutting edge 6a-6d toward a tip end of the tool as described below, which corresponds to a tangent line at the outermost end.

To improve the cutting performance of the peripheral cutting edges 7a-7d, and to increase rigidity to suppress chipping during cutting a side surface of a high-hardness, difficult-to-cut material, each peripheral cutting edge 7a-7d has a twist angle η within 35-45°. As shown in FIG. 1(d), the twist angle η is an angle between each peripheral cutting edge 7a-7d and the rotation axis Ax. When the twist angle η of the peripheral cutting edge 7a-7d is less than 35°, each peripheral cutting edge undergoes large resistance, highly likely resulting in chipping. On the other hand, when the twist angle η is larger than 45°, vibration occurs in a work due to an increased load, resulting in deteriorated quality of a machined surface. The twist angle η of the peripheral cutting edge 7a-7d is preferably 37-43°.

As shown in FIG. 1(d), the twist angle μ of each ball-end cutting edge 6a-6d and the twist angle η of each peripheral cutting edge 7a-7d should meet the relation of η−μ≤7°. When η−μ>7°, each cutting edge is largely curved at a connecting point (outermost peripheral point of each ball-end cutting edge) of each peripheral cutting edge 7a-7d and each ball-end cutting edge 6a-6d, causing chipping and breakage. η−μ≤6° is preferable, and η−μ≤5° is more preferable.

(b) Curve Angle of Ball-End Cutting Edge

The curve angle λ3 of each ball-end cutting edge 6a-6d at the outermost peripheral point is preferably 35-45°, more preferably 37-43°. The curve angle λ3 is an angle between a tangent line L1 of each ball-end cutting edge 6a-6d at its start point P (P1, P2, P3, P4), and a straight line L2 passing the start point P and an end point T3 (at a position of 0.5D from the rotation center axis O) of each ball-end cutting edge. When the curve angle λ3 is less than 35°, each ball-end cutting edge 6a-6d undergoes large resistance, so that chipping highly likely occurs during high-feed roughing of a high-hardness, difficult-to-cut material. On the other hand, when the curve angle 23 is more than 45°, a large load is applied to a work, causing vibration, so that a machined surface has low quality. Incidentally, the tangent line L1 of each ball-end cutting edge at its start point P is approximated by a straight line passing a point U (U1, U2, U3, U4) distant from the start point P (P1, P2, P3, P4) of each ball-end cutting edge 6a-6d by 0.01D herein.

Each ball-end cutting edge preferably has a curve angle λ1 of 6-13° at a point T1 distant from the rotation center axis O by 0.25D, and a curve angle λ2 of 14-22° at a position T2 distant from the rotation center axis O by 0.375D. The curve angle λ1 is an angle between the tangent line L1 of each ball-end cutting edge at its start point P and a straight line L3 passing the point T1 on each ball-end cutting edge, which is distant from the rotation center axis O by 0.25D. The curve angle λ2 is an angle between the tangent line L1 of each ball-end cutting edge at its start point P and the straight line L3 passing the point T2 on each ball-end cutting edge, which is distant from the rotation center axis O by 0.375D.

(c) Shape of Boundary of Ball-End Cutting Edge and Peripheral Cutting Edge

As shown in FIGS. 1(a)-1(c), in a region of each ball-end cutting edge 6a-6d near its boundary with each peripheral cutting edge 7a-7d, a rake face of each ball-end cutting edge 6a-6d preferably has such a shape that each second concave rake face 12a-12d having a positive rake angle enters a center portion of each first rake face 11a-11d having a negative rake angle. A tip end portion 20 of each second rake face 12a-12d entering each first rake face 11a-11d is in a curved shape. In FIGS. 1(c) and 1(d), reference numerals 26a, 26b, 26c respectively represent the outer ends of ball-end cutting edges. A ratio of the second rake face to the first rake face preferably gradually increases as nearing the boundary of each ball-end cutting edge 6a-6d and each peripheral cutting edge 7a-7d, with the second rake face 12a-12d reaching 100% at the boundary. Because each peripheral cutting edge 7a-7d has a large twist angle η, and because each ball-end cutting edge 6a-6d has a twist angle μ meeting the relation of η−μ≤7° in the present invention, each second rake face 12a-12d shortly enters each first rake face 11a-11d, securing high rigidity to each ball-end cutting edge 6a-6d.

(d) Shapes of Cutting Edge and Chip-Discharging Groove

In the ball portion 3a of the four-flute ball end mill 30 (FIG. 1) according to the second embodiment of the present invention, the cross section I-I, the cross section II-II, the cross section and the cross section IV-IV perpendicular to the rotation axis at positions distant by 0.10D, 0.25D, 0.40D and 0.70D in a rotation axis direction from the connecting point K of each center-lowered, inclined cutting edge and each ball-end cutting edge are shown in FIGS. 10(a), 10(b), 10(c), and 10(d), respectively.

Figure 10A:
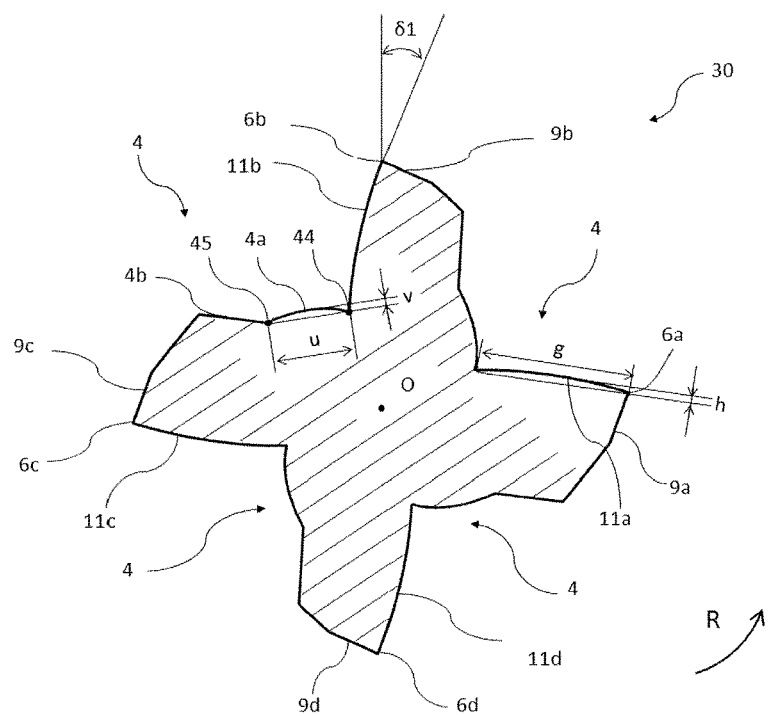
FIG. 10(a) is an enlarged view showing a I-I cross section of the four-flute ball end mill of FIG. 1, which is perpendicular to the rotation axis at a position distant by 0.10D in a rotation axis direction from the connecting point of the center-lowered, inclined cutting edge and the ball-end cutting edge.
Figure 10B:
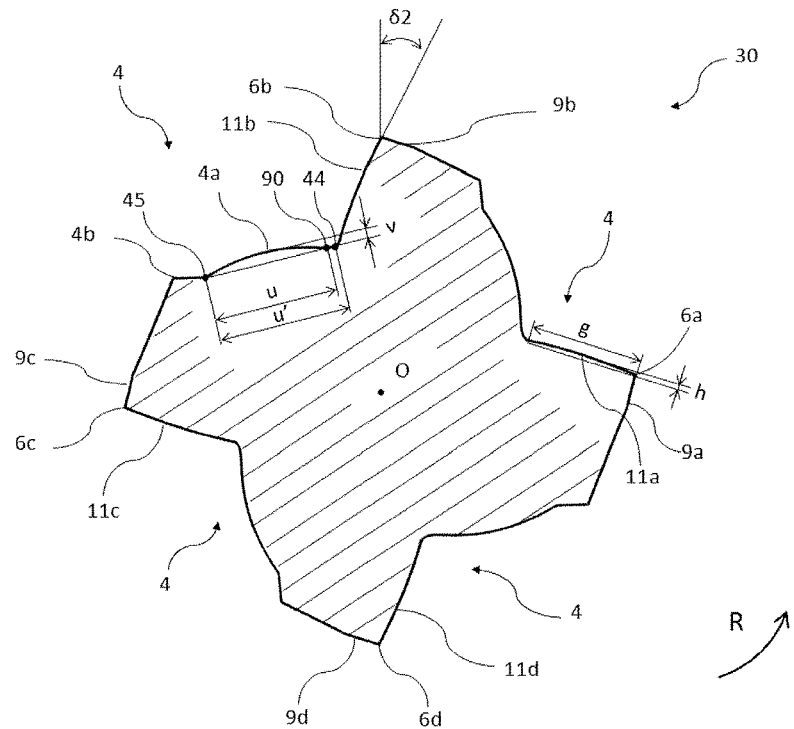
FIG. 10(b) is an enlarged view showing a II-II cross section of the four-flute ball end mill of FIG. 1, which is perpendicular to the rotation axis at a position distant by 0.25D in a rotation axis direction from the connecting point of the center-lowered, inclined cutting edge and the ball-end cutting edge.

As is clear from the I-I cross section (distant from the connecting point K by 0.10D) shown in FIG. 10(a) and the II-II cross section (distant from the connecting point K by 0.25D) shown in FIG. 10(b), each chip-discharging groove 4 in the ball portion 3a is constituted by a rake face 11b of the ball-end cutting edge 6b, a groove wall surface 4b extending from a flank 9c of the ball-end cutting edge 6c positioned forward in a rotation direction, and a groove bottom surface 4a therebetween. The groove bottom surface 4a spreads from its boundary 44 with the rake face 11b to its boundary 45 with the groove wall surface 4b. In this example, the groove bottom surface 4a is entirely convex, and the boundaries 44, 45 are respectively an inflection point between the rake face 11b and the groove bottom surface 4a, and an inflection point between the groove bottom surface 4a and the groove wall surface 4b. However, the present invention is not restricted thereto, but 50% or more of the length u of the groove bottom surface 4a need only be occupied by a convex surface. Other portions of the groove bottom surface 4a than the convex surface may be straight.

In FIGS. 10(a) and 10(b) showing cross sections perpendicular to the rotation axis, the rake face 11a-11d of each ball-end cutting edge 6a-6d is preferably a curved surface convexly projecting forward in a rotation direction. The curvature of a convexly curved surface of each rake face 11a-11d is expressed by a ratio h/g of the length h of a perpendicular line extending from an apex of the convexly curved surface to a line connecting both ends of the convexly curved surface to the length g of the above line. The curvature h/g of a convexly curved surface of each rake face 11a-11d is preferably 1-10% (for example, 3%). When the curvature h/g of a convexly curved surface of a rake face 11a-11d of each ball-end cutting edge 6a-6d is less than 1%, the ball portion 3a has insufficient rigidity and strength. On the other hand, more than 10% of the curvature h/g provides poor cutting performance, likely resulting in cracking due to seizure. The curvature h/g of a convexly curved surface of a rake face 11a-11d of each ball-end cutting edge 6a-6d is more preferably in a range of 1-8%.

The curvature of a convex surface of a groove bottom surface 4a of a chip-discharging groove 4 between the ball-end cutting edges 6b, 6c is expressed by a ratio v/u of the length v of a perpendicular line extending from an apex of the convex surface to a line connecting both ends 44, 45 of the convex surface to the length u of the above line. To provide each cutting edge with sufficient rigidity and strength, the curvature of each convex surface is preferably 5-40%, more preferably 8-35%. Less than 5% of the convex surface curvature provides the ball portion 3a with insufficient rigidity and strength, and more than 40% of the convex surface curvature makes a chip pocket too small.

In FIGS. 10(a) and 10(b), the radial rake angle [only δ1 is shown in FIG. 10(a), and only δ2 is shown in FIG. 10(b)] of each ball-end cutting edge is −37° to −11° (for example, δ1=−21°, and δ2=−25°, preferably −32° to −16°. When the radial rake angle of each ball-end cutting edge is less than −37°, the ball-end cutting edge exhibits insufficient cutting performance. When it is more than −11°, the ball-end cutting edge has low rigidity and strength. In both cases, the stable cutting of a high-hardness material is difficult.

As shown in FIGS. 10(a) and 10(b), in a range of 0.10D-0.25D in a rotation axis direction from the connecting point of each center-lowered, inclined cutting edge and each ball-end cutting edge, the rake face 11a-11d of each ball-end cutting edge is preferably convex. With such a convex rake face, chips can be smoothly discharged while keeping the strength of the ball-end cutting edge. When the ball-end cutting edge has a flat or concave rake face, chipping and breakage are likely to occur.

As is clear from the cross section (distant from the connecting point K by 0.40D) shown in FIGS. 1(a)-1(c) and 10(c), in a region of each ball-end cutting edge 6c near its boundary with each peripheral cutting edge 7c, it is preferable that the rake face of the ball-end cutting edge 6c has such a shape that a second concave rake face 12c (a portion of the rake face of the peripheral cutting edge 7c extending into the first rake face 11c) having a positive rake angle enters a center portion of the first rake face 11c having a negative rake angle; that a ratio of the second rake face 12c to the first rake face 11c gradually increases as nearing the boundary; and that the second rake face 12c is 100% at the boundary. Because the twist angle μ of each cutting edge and the twist angle η of each peripheral cutting edge are large in the present invention, a portion of the second rake face 12c entering the first rake face 11c is relatively small, resulting in high rigidity in a boundary of the ball-end cutting edge and the peripheral cutting edge.

Figure 10C:
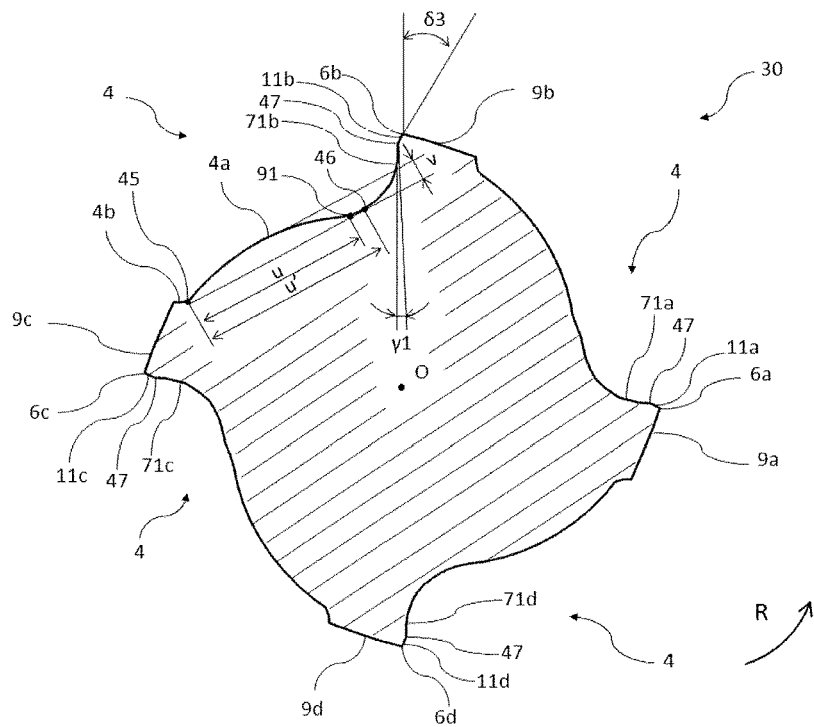
FIG. 10(c) is an enlarged view showing a cross section of the four-flute ball end mill of FIG. 1, which is perpendicular to the rotation axis at a position distant by 0.40D in a rotation axis direction from the connecting point of the center-lowered, inclined cutting edge and the ball-end cutting edge.

In FIG. 10(c), the rake face of the ball-end cutting edge 6b is constituted by a short first rake face 11b extending from the ball-end cutting edge 6b, and a second convex rake face 71b connected to the first rake face 11b at the boundary 47. The second rake face 71b is a portion of the rake face 12b of the peripheral cutting edge 7b entering the first rake face 11b. The second rake face 71b constitutes a chip-discharging groove 4 together with the convex groove bottom surface 4a and a groove wall surface 4b extending from the flank 9c of the ball-end cutting edge 6c positioned forward in a rotation direction. The groove bottom surface 4a spreads from its boundary 46 with the second rake face 71b to its boundary 45 with the groove wall surface 4b. The length u' of the groove bottom surface 4a in FIG. 10(c) is slightly larger than the length u of the convex surface in FIG. 10(b). To obtain the effects of the present invention, the convex surface occupies preferably 50% or more of the length u' of the groove bottom surface 4a. The groove bottom surface 4a may be straight in other regions than the convex surface.

The curvature v/u of a convex surface in each groove bottom surface shown in FIG. 10(c) is also preferably 5-40%, more preferably 8-35%, such that each cutting edge has sufficient rigidity and strength. The radial rake angle [only δ3 is shown in FIG. 10(c)] of each ball-end cutting edge is also −37° to −11° (for example, δ3=−27°, preferably −32° to −16°.

To provide each cutting edge with high rigidity and strength, from the I-I cross section distant by 0.10D in a rotation axis direction from the connecting point of each center-lowered, inclined cutting edge and each ball-end cutting edge to the cross section distant by 0.40D via the II-II cross section distant by 0.25D, (a) the radial rake angle of each ball-end cutting edge preferably gradually increases in a range from −37° to −11°; and (b) the curvature of a convex bottom surface portion of the chip-discharging groove between the ball-end cutting edges preferably gradually increases in a range from 5% to 40%. The curvature of a convex bottom surface portion of the chip-discharging groove of the peripheral cutting edge is preferably larger than the curvature of the convex bottom surface portion of the chip-discharging groove of the ball-end cutting edge. Also, the radial rake angle [only γ1 is shown in FIG. 10(c)] of each second rake face 71b is preferably 0-8°, more preferably 2-7°.

Figure 10D:
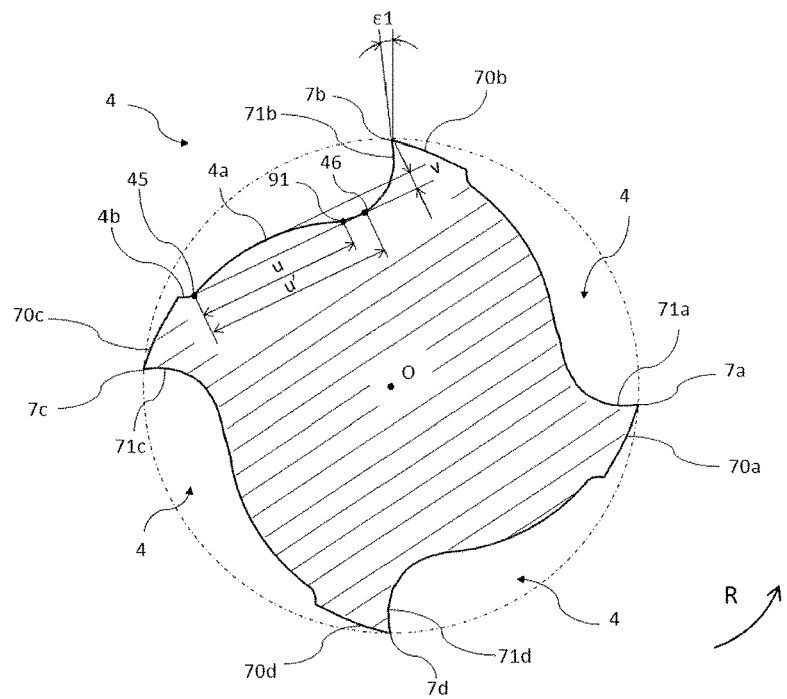
FIG. 10(d) is an enlarged view showing a IV-IV cross section the four-flute ball end mill of FIG. 1, which is perpendicular to the rotation axis at a position distant by 0.70D in a rotation axis direction from the connecting point of the center-lowered, inclined cutting edge and the ball-end cutting edge.

As is clear from the IV-IV cross section (distant from the connecting point K by 0.70D) shown in FIG. 10(d), each chip-discharging groove 4 in a peripheral cutting edge region is constituted by a concave rake face 71b extending from the peripheral cutting edge 7b in a rotation direction, a convex groove bottom surface 4a, and a groove wall surface 4b extending from the flank 70c of the peripheral cutting edge 7c positioned forward in a rotation direction. Also, the radial rake angle [only ε1 is shown in FIG. 10(d)] of each peripheral cutting edge is 2-8° (for example, ε1=7°), preferably 4-7°. When the radial rake angle of each peripheral cutting edge is less than 2°, the peripheral cutting edge exhibits insufficient cutting performance. On the other hand, when the radial rake angle is more than 8°, the peripheral cutting edge has low rigidity and strength. In both cases, the stable cutting of a high-hardness material is difficult.

(4) Production Method

Figure 11:
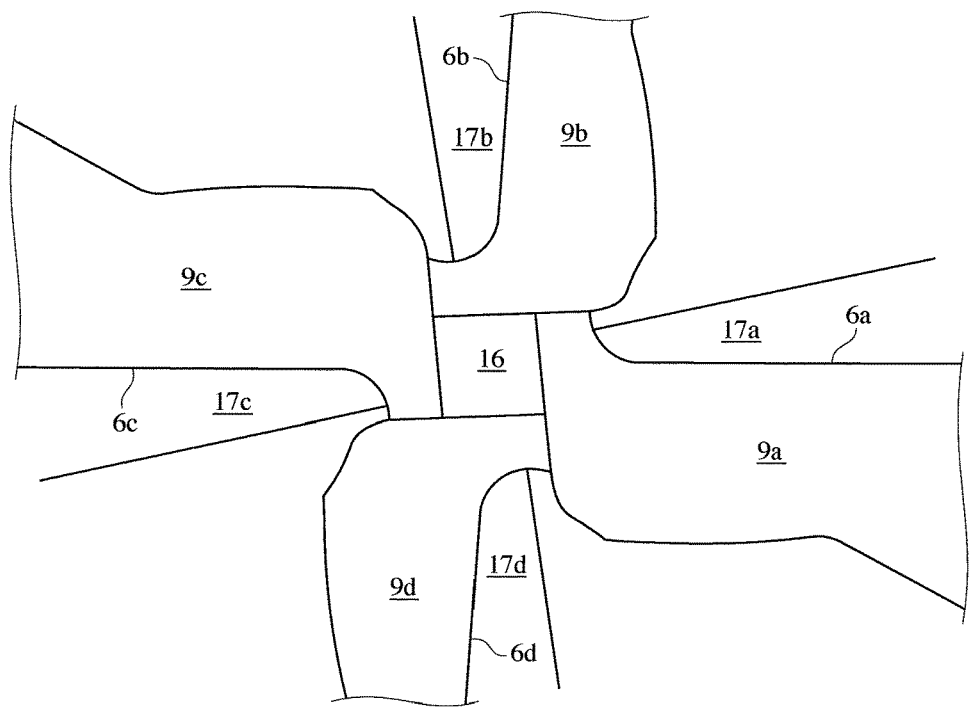
FIG. 11 is an enlarged front view showing a ball portion before center-lowered, inclined cutting edges are formed to produce the four-flute ball end mill of the present invention.

The production method of center-lowered, inclined cutting edges will be specifically explained below, taking the four-flute ball end mill 30 in the second embodiment for example. Using an NC machining center (not shown) equipped with a thin disc-shaped diamond grinder, four ball-end cutting edges 6a-6d are first successively formed as shown in FIG. 11. Because a portion near the rotation center point O is removed by forming the center-lowered, inclined cutting edges 8a-8d, the formation of the ball-end cutting edges 6a-6d is stopped near the rotation center point O. As a result, a square projection 16 remains in a region including the rotation center point O after grinding.

Figure 12:
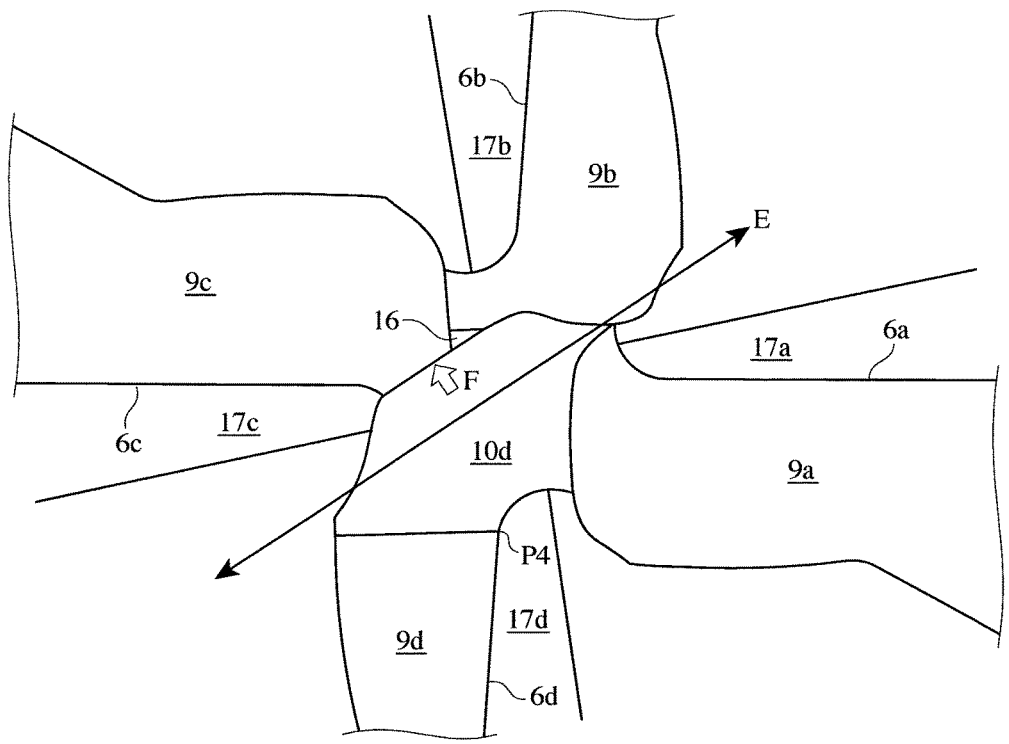
FIG. 12 is an enlarged front view showing a ball portion after one center-lowered, inclined cutting edge is formed.

As shown in FIG. 12, a thin disc-shaped diamond grinder reciprocating in a direction E is gradually lowered to a flank 9d of a ball-end cutting edge (for example, 6d), and moved from the point P4 in a direction shown by the arrow F, resulting in a flank 10d inclined rearward from the point P4 in a rotation axis direction. To avoid interference with a ball-end cutting edge 6c having another flank 9c abutting the flank 9d, the direction E should be inclined relative to the ball-end cutting edge 6c. The inclination angle of the direction E relative to the ball-end cutting edge 6c may be 20-50°. The inclination angle of less than 20° reduces grinding accuracy, and the inclination angle of more than 50° causes grinding interference. By carrying out this procedure on the flanks of all ball-end cutting edges, the center-lowered, inclined cutting edges 8a-8d shown in FIG. 8(b) are formed.

[2] Three-Flute Ball End Mill

Figure 13:
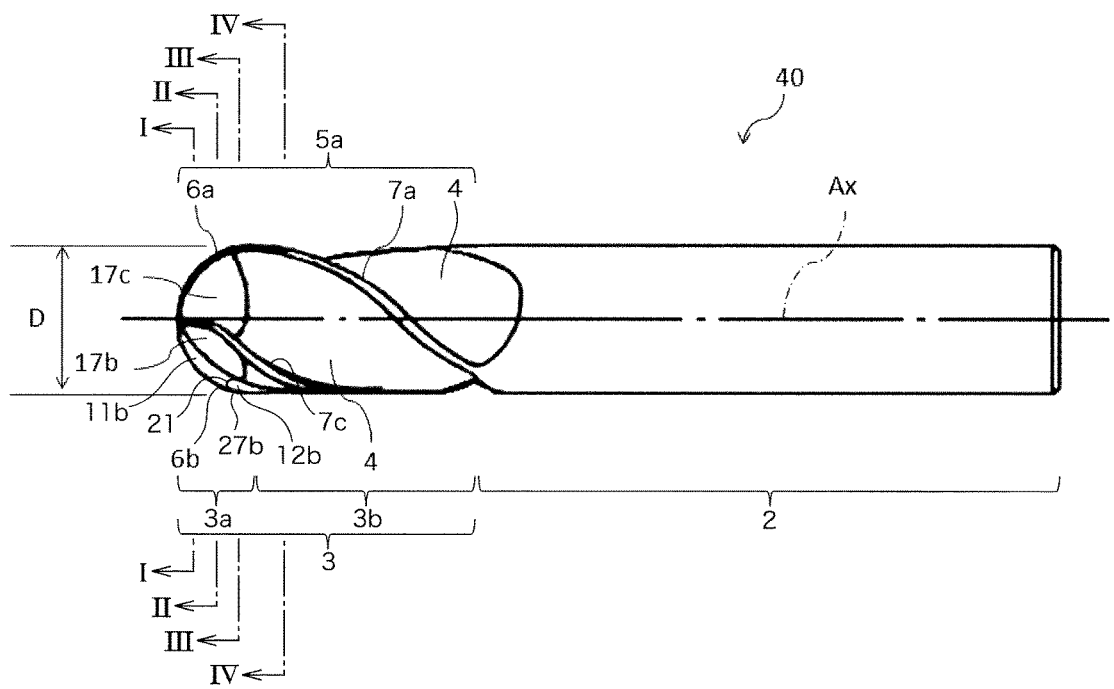
FIG. 13 is a side view showing the three-flute ball end mill of the present invention.
Figure 14:
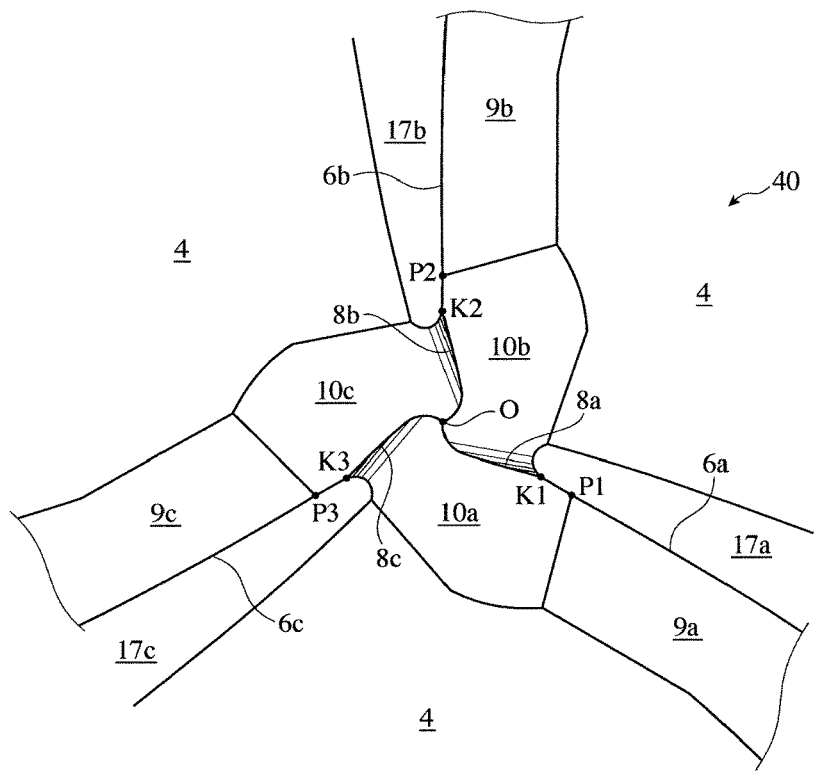
FIG. 14 is a partial, enlarged front view showing the center-lowered, inclined cutting edges of the three-flute ball end mill of FIG. 13.
Figure 15:
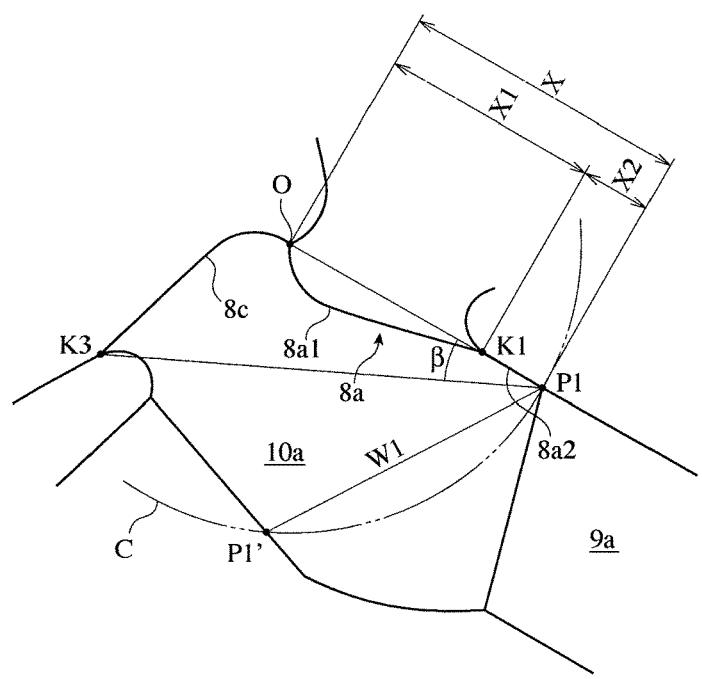
FIG. 15 is an enlarged front view showing part of a center-lowered, inclined cutting edge in FIG. 14.

FIG. 13 shows the three-flute ball end mill 40 of the present invention, and FIGS. 14 and 15 show center-lowered, inclined cutting edges in the three-flute ball end mill 40. In FIGS. 13-15, the same reference numerals are assigned to the same portions as in the above four-flute ball end mill. The three-flute ball end mill 40 comprises three ball-end cutting edges 6a, 6b, 6c, and center-lowered, inclined cutting edges 8a, 8b, 8c each integrally extending from the end P1, P2, P3 of each ball-end cutting edge 6a, 6b, 6c to a rotation center point O. A gash 17a, 17b, 17c is formed on the front side of each ball-end cutting edge 6a, 6b, 6c in a rotation direction.

The twist angles of the ball-end cutting edges and the peripheral cutting edges are the same as in the four-flute ball end mill. Namely, each peripheral cutting edge 7a-7c has a twist angle $\eta$ of 35-45°, and the twist angle $\mu$ of each ball-end cutting edge 6a-6c at the outermost peripheral point meets the relation of $\eta-\mu \leq 7°$, so that both cutting edges are smoothly connected. The twist angle $\eta$ of each peripheral cutting edge 7a-7c is preferably 37-43°.

The curve angle $\lambda 3$ of each ball-end cutting edge 6a-6c at the outermost peripheral point is preferably 65-95°, more preferably 75-90°, further preferably 77-87°. When the curve angle $\lambda 3$ is less than 65°, each ball-end cutting edge 6a-6c undergoes large resistance, so that chipping is highly likely to occur during high-feed roughing of a high-hardness, difficult-to-cut material. On the other hand, when the curve angle $\lambda 3$ is more than 95°, a large load is applied to a work, causing vibration, and thus resulting in deteriorated quality of a machined surface.

As shown in FIG. 13, in a region of each ball-end cutting edge 6a-6c near its boundary with each peripheral cutting edge 7a-7c, a rake face of each ball-end cutting edge 6a-6c preferably has such a shape that each second concave rake face 12a-12c having a positive rake angle enters a center portion of each first rake face 11a-11c having a negative rake angle. A reference numeral of 27b represents an outer end of the ball-end cutting edge 6b. A tip end portion 21 of each second rake face 12a-12c entering each first rake face 11a-11c is in a curved shape. A ratio of the second rake face to the first rake face preferably gradually increases as nearing the boundary of each ball-end cutting edge 6a-6c and each peripheral cutting edge 7a-7c, with the second rake face 12a-12d reaching 100% at the boundary. Because each peripheral cutting edge 7a-7c has a large twist angle $\eta$, and the twist angle $\eta$ of each peripheral cutting edge 7a-7c and the twist angle $\mu$ of each ball-end cutting edge 6a-6c meet the relation of $\eta-\mu \leq 7°$, in the present invention, a short portion of each second rake face 12a-12c enters each first rake face 11a-11c, securing high rigidity to each ball-end cutting edge 6a-6c.

As shown in FIG. 15, the center-lowered, inclined cutting edge 8a has an arcuate portion 8a1 curved rearward in a rotation direction, and a ball-end cutting edge extension 8a2. Of course, the ball-end cutting edge extension 8a2 may be omitted, and the arcuate portion 8a1 need not be entirely curved but may have a curve portion and a straight portion. This is also true in the other center-lowered, inclined cutting edges 8b, 8c. Though not shown, each center-lowered, inclined cutting edge 8a, 8b, 8c is inclined with an inclination angle $\alpha$ of 0.5-3° relative to a plane perpendicular to the rotation axis, such that the rotation center point O is positioned on the rear side of the connecting point P1, P2, P3 of each center-lowered, inclined cutting edge 8a, 8b, 8c and each ball-end cutting edge 6a, 6b, 6c in a rotation axis direction.

As shown in FIG. 15, a ratio of the radial length X1 of the arcuate portion 8a1 to the radial length X of the center-lowered, inclined cutting edge 8a is preferably 20-100%, more preferably 30-100%, most preferably 60-95%, as in the first embodiment. The circumferential width W1 of the flank 10a at the connecting point P1 of the center-lowered, inclined cutting edge 8a and the ball-end cutting edge 6a is preferably 20-80%, more preferably 30-70%, of the maximum circumferential width of the flank 9a of the ball-end cutting edge. The radial length X (radial distance between the outer end P1 of the ball-end cutting edge 6a and the rotation center point O) of the center-lowered, inclined cutting edge 8a when viewed along the rotation axis is preferably 1.25-3.75%, more preferably 1.5-3.5%, of the diameter D of the cutting edge portion 3. Of course, this is also true in other center-lowered, inclined cutting edges 8b, 8c. In the case of the three-flute ball end mill, too, the center angle $\beta$ of the arcuate portion of the center-lowered, inclined cutting edges 8c is preferably 20-70°, more preferably 30-60°, most preferably 40-48°, as in the first embodiment.

The I-I cross section, the II-II cross section, the cross section and the IV-IV cross section perpendicular to the rotation axis at positions distant by 0.10D, 0.25D, 0.40D and 0.70D in a rotation axis direction from the connecting point K of each center-lowered, inclined cutting edge and each ball-end cutting edge are shown in FIGS. 16(a), 16(b), 16(c) and 16(d), respectively.

Figure 16A:
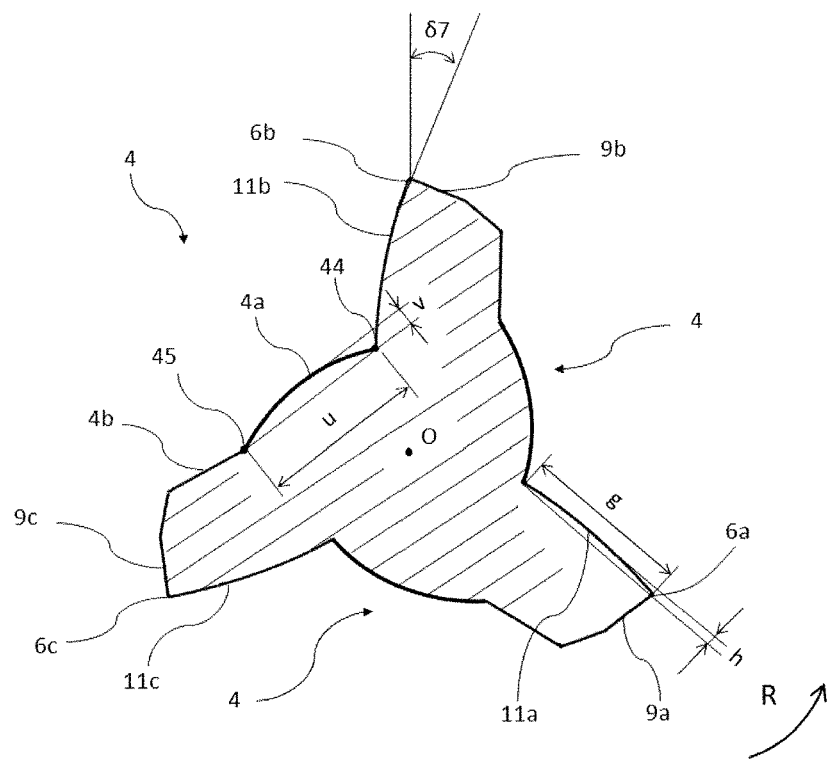
FIG. 16(a) is an enlarged view showing a I-I cross section of the three-flute ball end mill of FIG. 13, which is perpendicular to the rotation axis at a position distant by 0.10D in a rotation axis direction from the connecting point of the center-lowered, inclined cutting edge and the ball-end cutting edge.
Figure 16B:
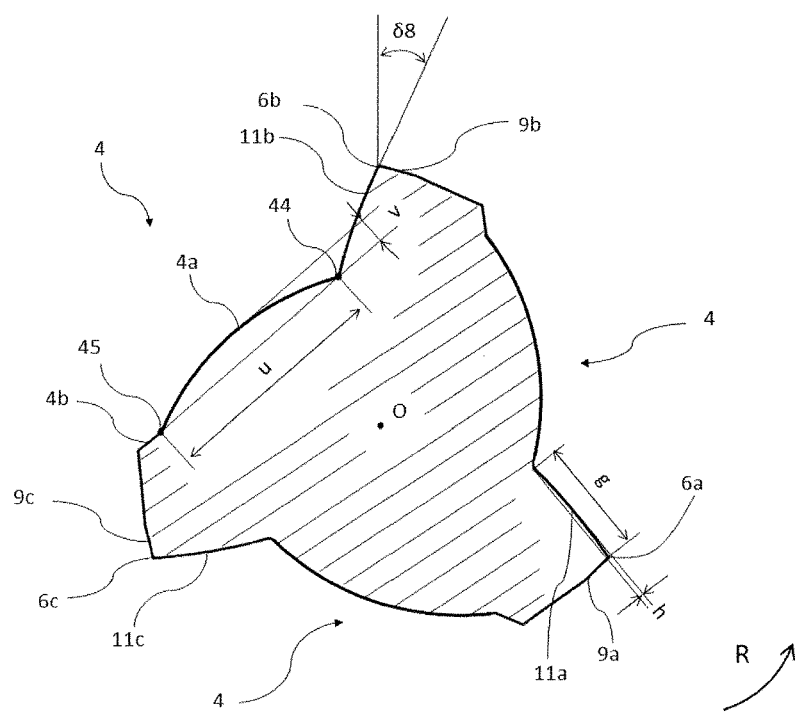
FIG. 16(b) is an enlarged view showing a II-II cross section of the three-flute ball end mill of FIG. 13, which is perpendicular to the rotation axis at a position distant by 0.25D in a rotation axis direction from the connecting point of the center-lowered, inclined cutting edge and the ball-end cutting edge.

In the I-I cross section shown in FIG. 16(a) and the II-II cross section shown in FIG. 16(b), each chip-discharging groove 4 of the ball-end cutting edge is formed by a rake face 11b, a convex groove bottom surface 4a, and a groove wall surface 4b extending from the flank 9c of the ball-end cutting edge 6c positioned forward in a rotation direction. Though the groove bottom surface 4a is entirely convex in FIGS. 16(a) and 16(b), a convex surface occupies preferably 50% or more of the length u of the groove bottom surface 4a, to obtain the effects of the present invention. Other portions of the groove bottom surface 4a than the convex surface portion may be straight. The groove bottom surface 4a expands from its boundary 44 with the rake face 11b of the ball-end cutting edge to its boundary 45 with the groove wall surface 4b.

As shown in FIGS. 16(a) and 16(b), the rake face 11a-11c of each ball-end cutting edge 6a-6c is preferably a curved surface convexly projecting forward in a rotation direction. The curvature h/g of the convexly curved surface of each rake face 11a-11c is preferably 1-10%, more preferably 1-8%. The curvature v/u of a convex surface in the groove bottom surface of each chip-discharging groove 4 between the ball-end cutting edges is also preferably 5-40%, more preferably 8-35%, such that each cutting edge has sufficient rigidity and strength. When the convex surface has a curvature of less than 5%, the ball portion 3a has insufficient rigidity and strength. When the curvature is more than 40%, a chip pocket is too small. The radial rake angle [only $\delta 7$ is shown in FIG. 16(a), and only $\delta 8$ is shown in FIG. 16(b)] of each ball-end cutting edge is also −37° to −11°, preferably −32° to −16°. When the radial rake angle of each ball-end cutting edge is less than −37°, the ball-end cutting edge has insufficient cutting performance. When the radial rake angle is more than −11°, the ball-end cutting edge has low rigidity and strength. In both cases, the stable cutting of a high-hardness material is difficult.

Figures 16C, 16D:
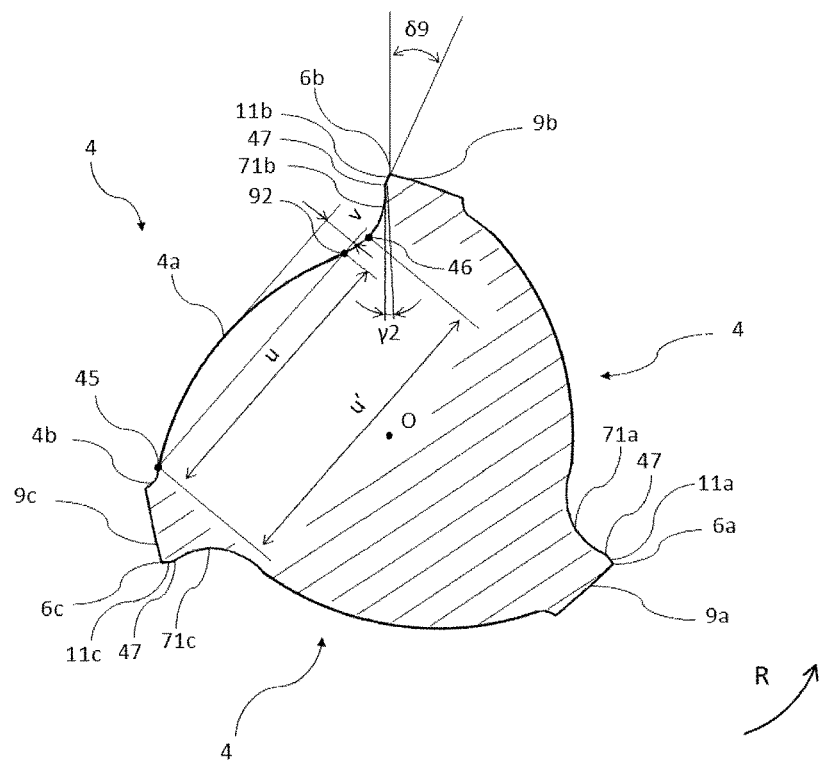
FIG. 16(c) is an enlarged view showing a cross section of the three-flute ball end mill of FIG. 13, which is perpendicular to the rotation axis at a position distant by 0.40D in a rotation axis direction from the connecting point of the center-lowered, inclined cutting edge and the ball-end cutting edge.
FIG. 16(d) is an enlarged view showing a IV-Iv cross section of the three-flute ball end mill of FIG. 13, which is perpendicular to the rotation axis at a position distant by 0.70D in a rotation axis direction from the connecting point of the center-lowered, inclined cutting edge and the ball-end cutting edge.

As is clear from the cross section (distant from the connecting point K by 0.40D) shown in FIG. 16(c), in a connecting region of each ball-end cutting edge and each peripheral cutting edge, the rake face of the ball-end cutting edge 6b is constituted by a first short rake face 11b extending from the ball-end cutting edge 6b, and a second concave rake face 71b connected to the first rake face 11b at the boundary 47, like the four-flute ball end mill. Each chip-discharging groove 4 is constituted by first and second rake faces 11b, 71b, a convex groove bottom surface 4a, a groove wall surface 4b extending from a flank 9c of a ball-end cutting edge 6c positioned forward in a rotation direction. The groove bottom surface 4a spreads from its boundary 46 with the second rake face 71b to its boundary 45 with the groove wall surface 4b. The length u' of the groove bottom surface 4a in FIG. 16(c) is slightly longer than the length u of the convex surface in FIG. 16(b). Other portions of the groove bottom surface 4a than the convex surface may be straight. To obtain the effects of the present invention, preferably 50% or more of the length u' of the groove bottom surface 4a is occupied by a convex surface.

The curvature v/u of a convex surface in each groove bottom surface 4a shown in FIG. 16(c) is preferably 5-40%, more preferably 8-35%, such that each cutting edge has sufficient rigidity and strength. The radial rake angle [only δ9 is shown in FIG. 16(c)] of each ball-end cutting edge is also −37° to −11°, preferably −32° to −16°.

In the three-flute ball end mill, too, to provide each cutting edge with increased rigidity and strength, from the I-I cross section distant by 0.10D in a rotation axis direction from the connecting point of each center-lowered, inclined cutting edge and each ball-end cutting edge to the cross section distant by 0.40D via the II-II cross section distant by 0.25D, (a) the radial rake angle of each ball-end cutting edge preferably gradually increases in a range from −37° to −11°; and (b) the curvature of a convex bottom surface portion in a chip-discharging groove between the ball-end cutting edges preferably gradually increases in a range from 5% to 40%. The curvature of a convex bottom surface portion of a chip-discharging groove of a peripheral cutting edge is preferably larger than the curvature of a convex bottom surface portion of a chip-discharging groove of a ball-end cutting edge. The radial rake angle [only γ2 is shown in FIG. 16(c)] of each second rake face 71b is preferably 0-8°, more preferably 2-7°.

As is clear from the Iv-Iv cross section (distant from the connecting point K by 0.70D) shown in FIG. 16(d), each chip-discharging groove 4 in a peripheral cutting edge region is constituted by a rake face 71b of a peripheral cutting edge 7b, a convex groove bottom surface 4a, and a groove wall surface 4b extending from a flank 70c of a peripheral cutting edge positioned forward in a rotation direction. The radial rake angle [only ε2 is shown in FIG. 16(d)] of each peripheral cutting edge is 2-8°, preferably 4-7°. When the radial rake angle of each peripheral cutting edge is less than 2°, the peripheral cutting edge has insufficient cutting performance. When the radial rake angle is more than 8°, the peripheral cutting edge has low rigidity and strength. In both cases, the stable cutting of a high-hardness material is difficult.

[3] Five-Flute Ball End Mill

In the ball portion 3a of the five-flute ball end mill 50 (FIG. 17) of the present invention, the I-I cross section, the II-II cross section, the cross section and the Iv-Iv cross section perpendicular to the rotation axis at positions distant by 0.10D, 0.25D, 0.40D and 0.70D in a rotation axis direction from the connecting point K of each center-lowered, inclined cutting edge and each ball-end cutting edge are shown in FIGS. 20(a), 20(b), 20(c) and 20(d), respectively.

The twist angles of the ball-end cutting edges and the peripheral cutting edges are the same as in the four-flute ball end mill. Namely, each peripheral cutting edge 7a-7e has a twist angle η of 35-45°, and a twist angle μ of each ball-end cutting edge 6a-6e at the outermost peripheral point meets the relation of η−μ≤7°, so that both cutting edges are smoothly connected. The twist angle of each peripheral cutting edge 7a-7e is preferably 37-43°.

The curve angle λ3 of each ball-end cutting edge 6a-6e at the outermost peripheral point is preferably 25-35°, more preferably 27-33°. When the curve angle λ3 is less than 25°, each ball-end cutting edge 6a-6e undergoes large resistance, so that chipping is highly likely to occur during high-feed roughing of a high-hardness, difficult-to-cut material. On the other hand, when the curve angle λ3 is more than 35°, a large load is applied to a work, resulting in vibration, and thus deteriorated quality of a machined surface.

Figure 17:
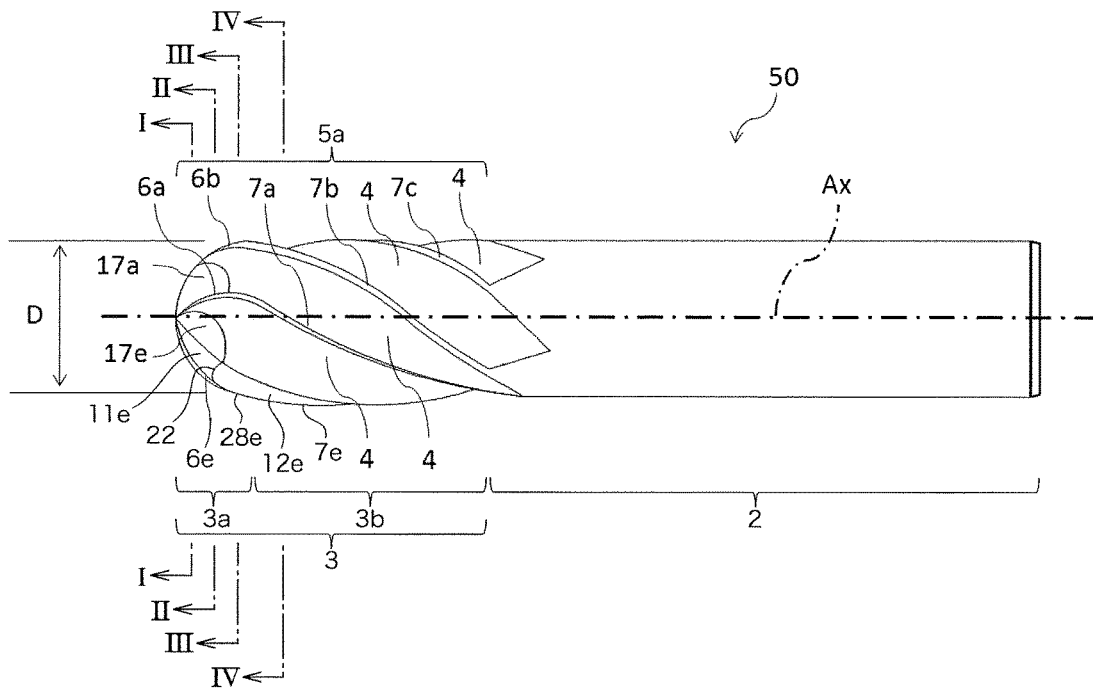
FIG. 17 is a side view showing the five-flute ball end mill of the present invention.
Figure 18:
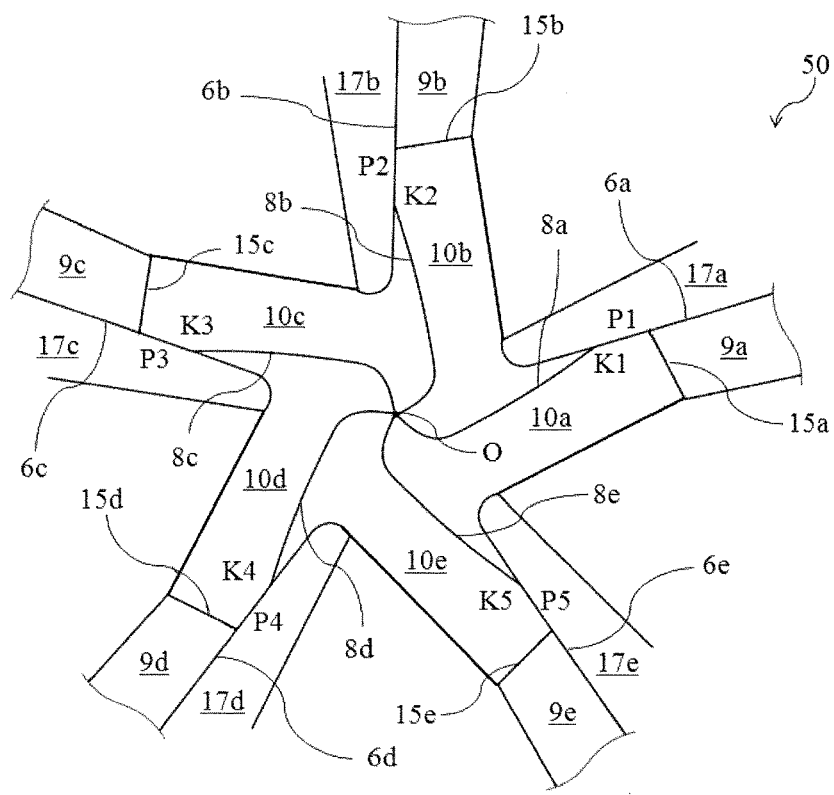
FIG. 18 is an enlarged front view showing the center-lowered, inclined cutting edges of the five-flute ball end mill in FIG. 17.
Figure 19:
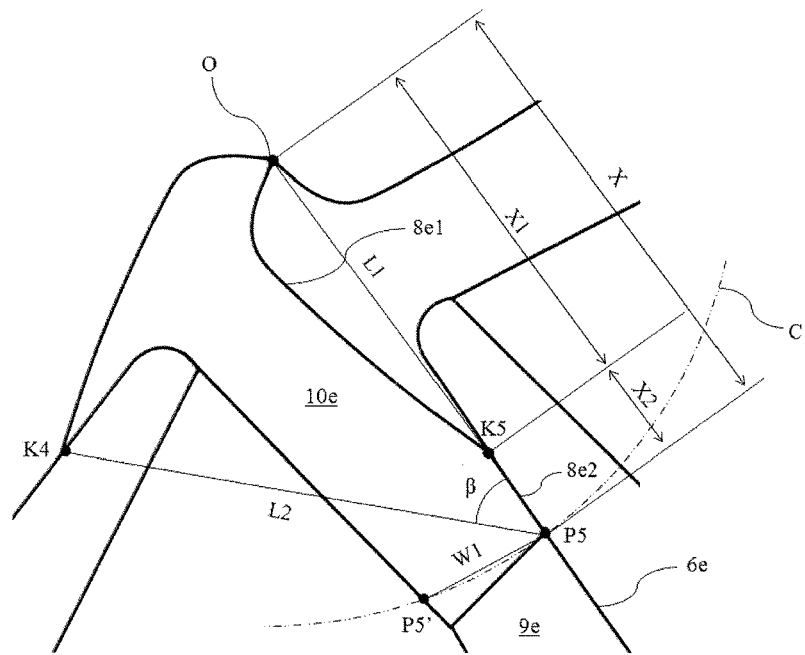
FIG. 19 is an enlarged front view showing part of a center-lowered, inclined cutting edge in FIG. 18.

As shown in FIG. 17, in a region of a ball-end cutting edge 6a-6e near its boundary with each peripheral cutting edge 7a-7e, a rake face of each ball-end cutting edge 6a-6e preferably has such a shape that each second concave rake face 12a-12c having a positive rake angle enters a center portion of each first rake face 11a-11e having a negative rake angle. A reference numeral of 28e represents an outer end of a ball-end cutting edge 6e. A tip end portion 22 of each second rake face 12a-12e entering each first rake face 11a-11e is in a curved shape. A ratio of the second rake face to the first rake face preferably gradually increases as nearing the boundary of each ball-end cutting edge 6a-6e and each peripheral cutting edge 7a-7e, with the second rake face 12a-12e reaching 100% at the boundary. In the present invention, each peripheral cutting edge 7a-7e has a large twist angle η, and the twist angle η of each ball-end cutting edge 6a-6e meets the relation of η−μ≤7°, so that a short portion of each second rake face 12a-12e enters each first rake face 11a-11e, and that each ball-end cutting edge 6a-6e has high rigidity.

Figure 20A:
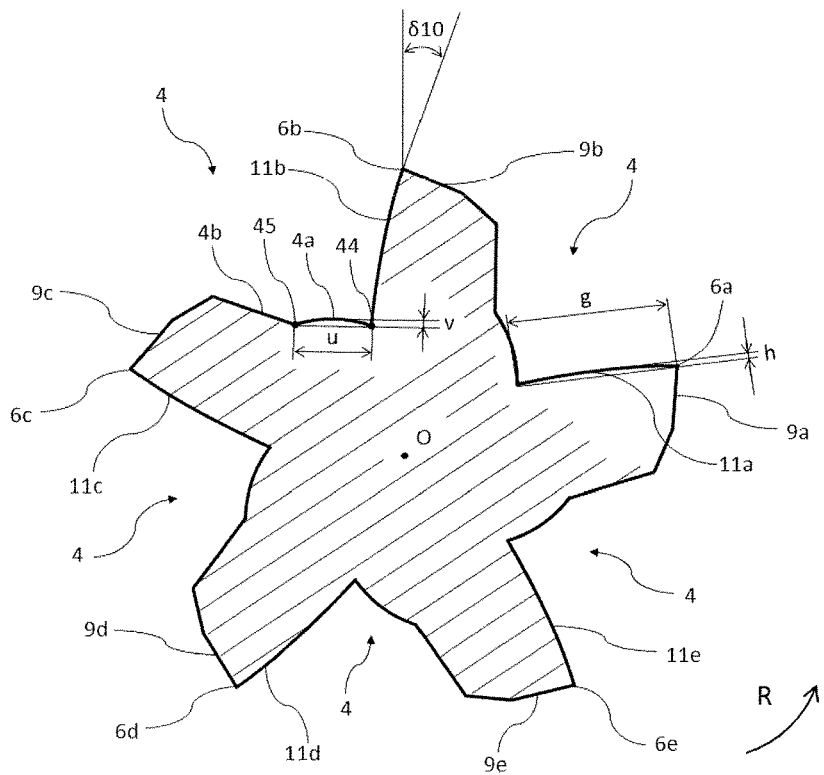
FIG. 20(a) is an enlarged view showing a I-I cross section of the five-flute ball end mill of FIG. 17, which is perpendicular to the rotation axis at a position distant by 0.10D in a rotation axis direction from the connecting point of the center-lowered, inclined cutting edge and the ball-end cutting edge.
Figure 20B:
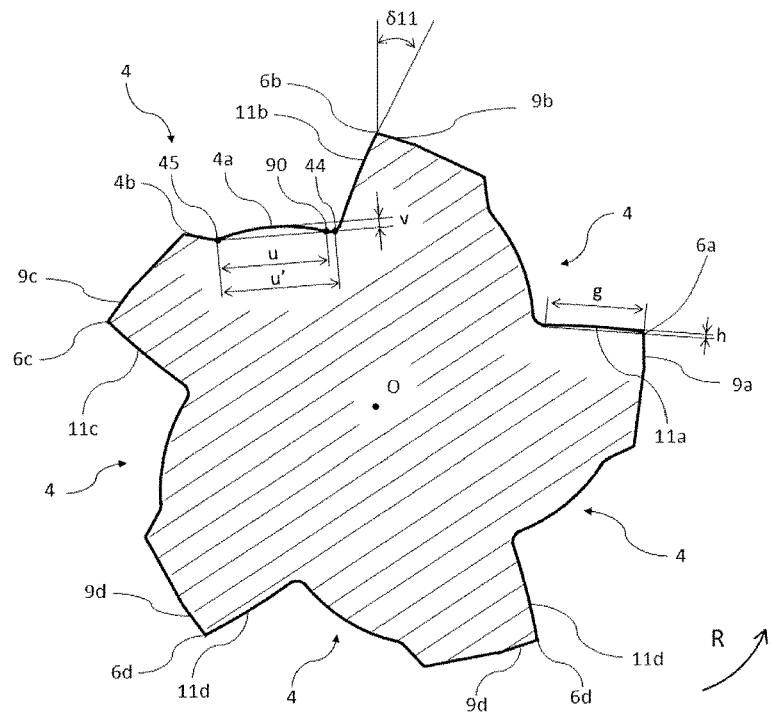
FIG. 20(b) is an enlarged view showing a II-II cross section of the five-flute ball end mill of FIG. 17, which is perpendicular to the rotation axis at a position distant by 0.25D in a rotation axis direction from the connecting point of the center-lowered, inclined cutting edge and the ball-end cutting edge.

As shown in FIGS. 20(a) and 20(b), the rake face 11a-11e of each ball-end cutting edge 6a-6e is preferably a curved surface convexly projecting forward in a rotation direction. The curvature h/g of a convexly curved surface in each rake face 11a-11e is preferably 1-10%, more preferably 1-8%. The curvature v/u of a convex surface in the groove bottom surface 4a of each chip-discharging groove 4 between the ball-end cutting edges is preferably 5-40%, more preferably 8-35%, such that each cutting edge has sufficient rigidity and strength. When the convex surface has a curvature of less than 5%, the ball portion 3a has insufficient rigidity and strength. When the curvature is more than 40%, a chip pocket is too small.

The radial rake angle [only δ10 is shown in FIG. 20(a), and only δ11 is shown in FIG. 20(b)] of each ball-end cutting edge shown in FIGS. 20(a) and 20(b) is −37° to −11°, preferably −32° to −16°. When the radial rake angle of each ball-end cutting edge is less than −37°, the ball-end cutting edge has insufficient cutting performance. When the radial rake angle is more than −11°, the ball-end cutting edge has low rigidity and strength. In both cases, the stable cutting of a high-hardness material is difficult.

Figure 20C:
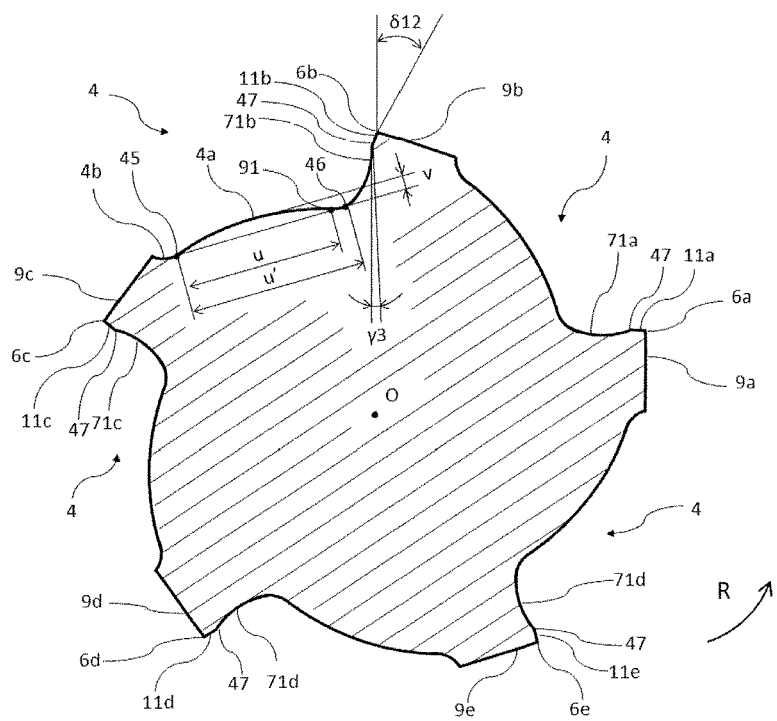
FIG. 20(c) is an enlarged view showing a cross section of the five-flute ball end mill of FIG. 17, which is perpendicular to the rotation axis at a position distant by 0.40D in a rotation axis direction from the connecting point of the center-lowered, inclined cutting edge and the ball-end cutting edge.

As is clear from the cross section (distant from the connecting point K by 0.40D) shown in FIG. 20(c), in a connecting region of each ball-end cutting edge and each peripheral cutting edge, a rake face of a ball-end cutting edge 6b is constituted by a second short rake face 11b extending from the ball-end cutting edge 6b, and a second concave rake face 71b connected to the second rake face 11b at the boundary 47, like the four-flute ball end mill. Each chip-discharging groove 4 is constituted by first and second rake faces 11b, 71b, a convex groove bottom surface 4a, and a groove wall surface 4b extending from a flank 9c of a ball-end cutting edge 6c positioned forward in a rotation direction. The groove bottom surface 4a spreads from its boundary 46 with the second rake face 71b to its boundary 45 with the groove wall surface 4b. The length u' of the groove bottom surface 4a in FIG. 20(c) is slightly longer than the length u of the convex surface in FIG. 20(b). To obtain the effects of the present invention, preferably 50% or more of the length u' of the groove bottom surface 4a is occupied by a convex surface. Other portions of the groove bottom surface 4a than the convex surface may be straight.

The curvature v/u of a convex surface in each groove bottom surface shown in FIG. 20(c) is also preferably 5-40%, more preferably 8-35%, such that each cutting edge has sufficient rigidity and strength. The radial rake angle [only δ12 is shown in FIG. 20(c)] of each ball-end cutting edge is also −37° to −11°, preferably −32° to −16°.

In the five-flute ball end mill, too, to provide each cutting edge with high rigidity and strength, from the I-I cross section distant by 0.10D in a rotation axis direction from the connecting point of each center-lowered, inclined cutting edge and each ball-end cutting edge to the cross section distant by 0.40D via the II-II cross section distant by 0.25D, (a) a radial rake angle of each ball-end cutting edge preferably gradually increases in a range from −37° to −11°; and (b) the curvature of a convex bottom surface portion of each chip-discharging groove between the ball-end cutting edges preferably gradually increases in a range from 5% to 40%. The curvature of a convex bottom surface portion of a chip-discharging groove of a peripheral cutting edge is preferably larger than the curvature of a convex bottom surface of a chip-discharging groove of a ball-end cutting edge. The radial rake angle [only γ3 is shown in FIG. 20(c)] of each second rake face 71b is preferably 0-8°, more preferably 2-7°.

Figure 20D:
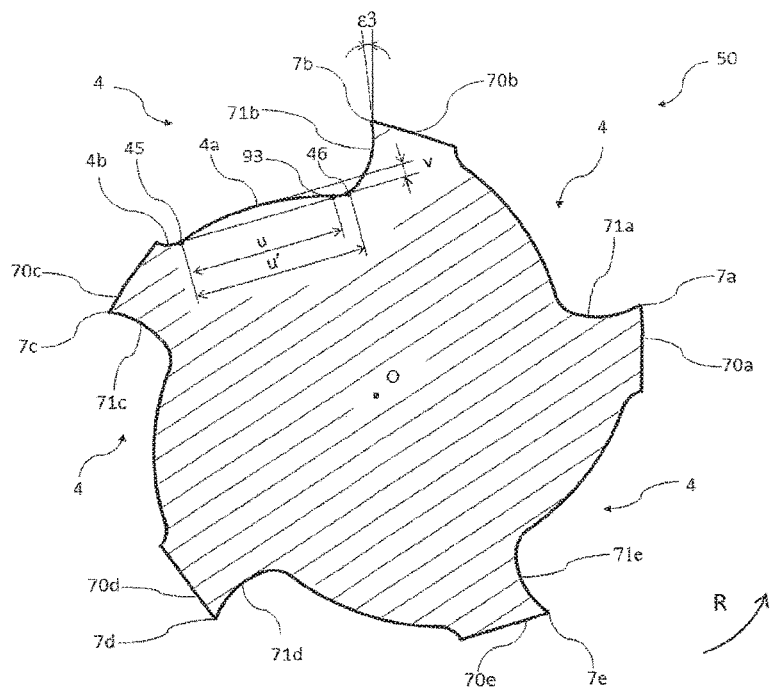
FIG. 20(d) is an enlarged view showing a IV-IV cross section of the five-flute ball end mill of FIG. 17, which is perpendicular to the rotation axis at a position distant by 0.70D in a rotation axis direction from the connecting point of the center-lowered, inclined cutting edge and the ball-end cutting edge.

As is clear from the IV-IV cross section (distant from the connecting point K by 0.70D) shown in FIG. 20(d), each chip-discharging groove 4 in a peripheral cutting edge region is constituted by a rake face 71b of a peripheral cutting edge 7b, a convex groove bottom surface 4a, and a groove wall surface 4b extending from a flank 70c of a peripheral cutting edge positioned forward in a rotation direction. The radial rake angle [only ε3 is shown in FIG. 20(d)] of each peripheral cutting edge is 2-8°, preferably 4-7°. When the radial rake angle of each peripheral cutting edge is less than 2°, the peripheral cutting edge has insufficient cutting performance. When the radial rake angle is more than 8°, the peripheral cutting edge has low rigidity and strength. In both cases, the stable cutting of a high-hardness material is difficult.

[3] Six-Flute Ball End Mill

Figure 21:
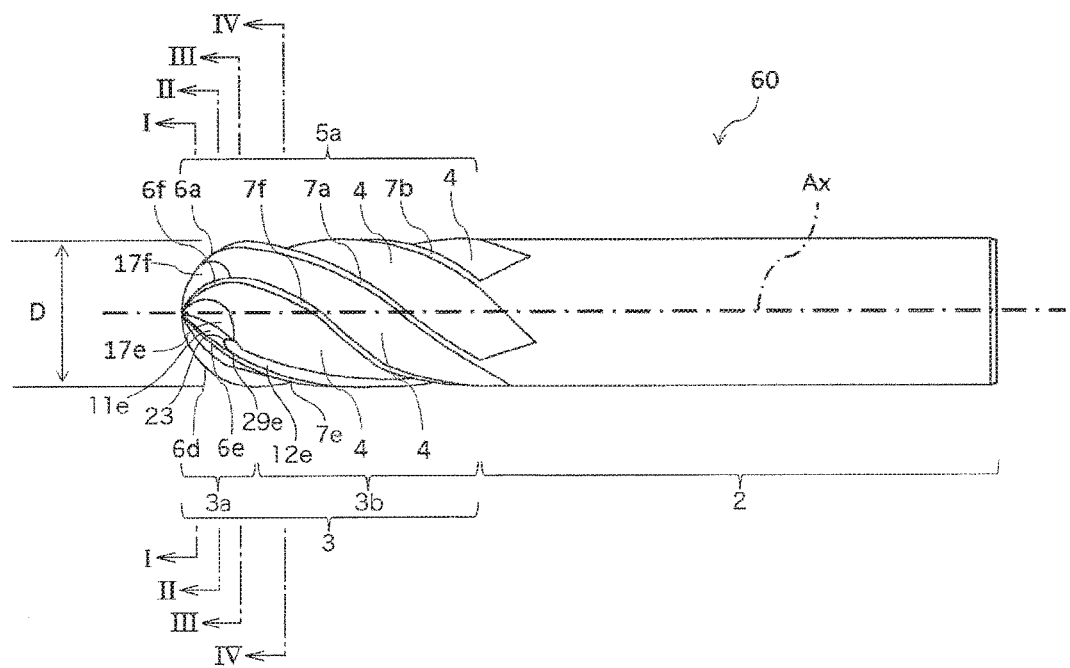
FIG. 21 is a side view showing the six-flute ball end mill of the present invention.
Figure 22:
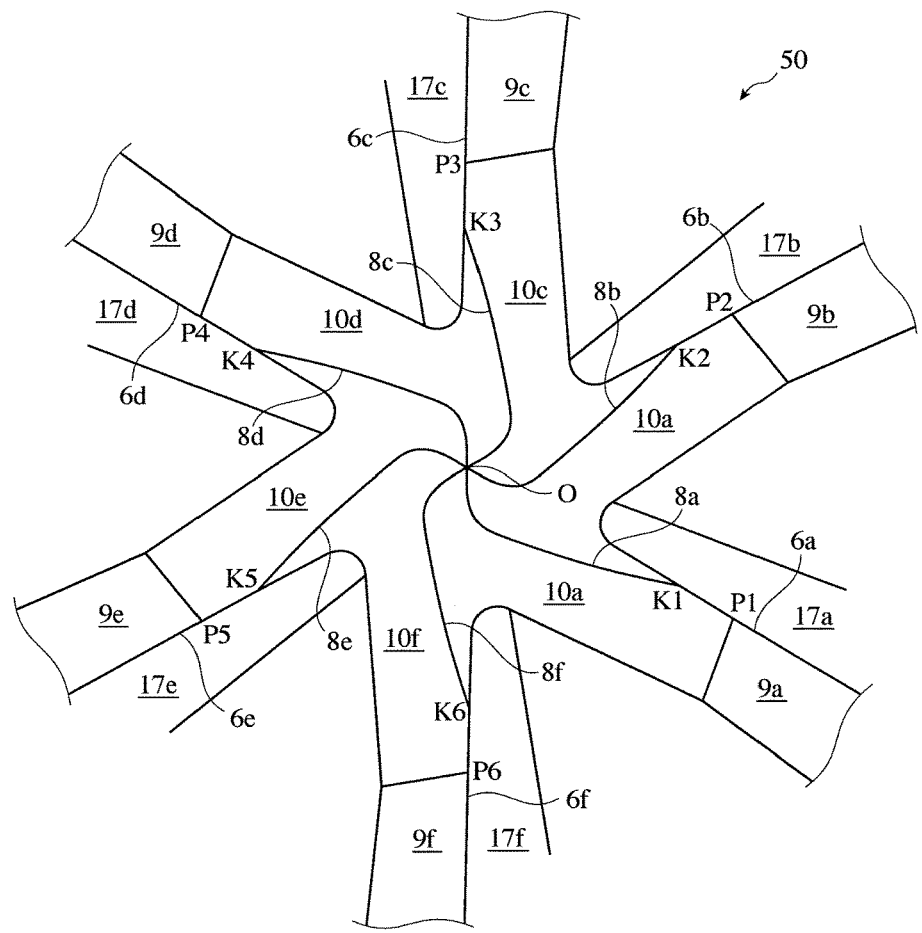
FIG. 22 is an enlarged front view showing the center-lowered, inclined cutting edges of the six-flute ball end mill of FIG. 21.
Figure 23:
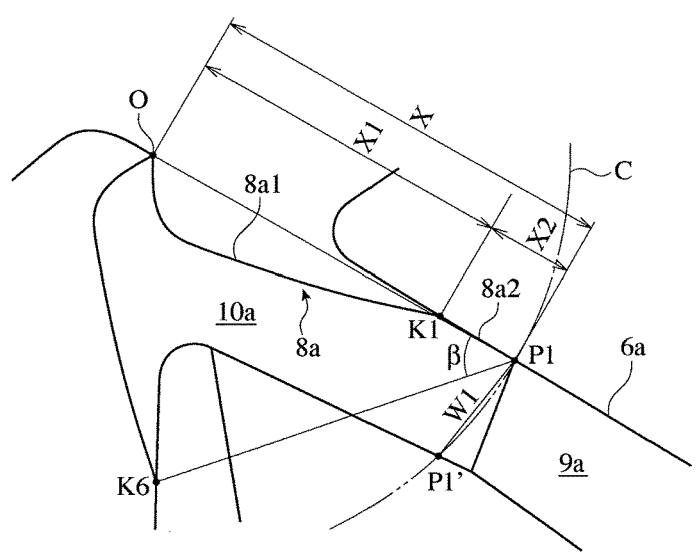
FIG. 23 is an enlarged front view showing part of a center-lowered, inclined cutting edge in FIG. 22.

FIG. 21 shows the six-flute ball end mill 60 of the present invention, and FIGS. 22 and 23 show center-lowered, inclined cutting edges in the six-flute ball end mill 60. In FIGS. 21-23, the same reference numerals are assigned to the same portions as in the four-flute ball end mill. The six-flute ball end mill 60 comprises six ball-end cutting edges 6a, 6b, 6c, 6d, 6e, 6f, and center-lowered, inclined cutting edges 8a, 8b, 8c, 8d, 8e, 8f integrally extending from the ends P1, P2, P3, P4, P5, P6 of the ball-end cutting edges 6a-6f to the rotation center point O. A gash 17a, 17b, 17c, 17d, 17e, 17f is formed on the front side of each ball-end cutting edge 6a-6f in a rotation direction.

The twist angles of the ball-end cutting edges and the peripheral cutting edges are the same as in the four-flute ball end mill. Namely, each peripheral cutting edge 7a-7f has a twist angle η of 35-45°, and the twist angle μ of each ball-end cutting edge 6a-6f a at the outermost peripheral point meets the relation of $\eta-\mu \leq 7°$, so that both cutting edges are smoothly connected. The twist angle η of each peripheral cutting edge 7a-7f is preferably 37-43°.

The curve angle λ3 of each ball-end cutting edge 6a-6f at the outermost peripheral point is preferably 20-30°, more preferably 22-28°. When the curve angle λ3 is less than 20°, each ball-end cutting edge 6a-6d undergoes large resistance, so that chipping is highly likely to occur during high-feed roughing of a high-hardness, difficult-to-cut material. On the other hand, when the curve angle λ3 is more than 30°, a large load is applied to a work, resulting in vibration, and thus deteriorated quality of a machined surface.

As shown in FIG. 21, in a region of a ball-end cutting edge 6a-6f near its boundary with each peripheral cutting edge 7a-7f, a rake face of each ball-end cutting edge 6a-6f preferably has such a shape that each second concave rake face 12a-12f having a positive rake angle enters a center portion of each first rake face 11a-11f having a negative rake angle. The reference numeral of 29e represents an outer end of a ball-end cutting edge 6e. A tip end portion 23 of each second rake face 12a-12f entering each first rake face 11a-11f is in a curved shape. A ratio of the second rake face to the first rake face preferably gradually increases as nearing the boundary of each ball-end cutting edge 6a-6f and each peripheral cutting edge 7a-7f, with the second rake face 12a-12f reaching 100% at the boundary. In the present invention, each peripheral cutting edge 7a-7f has a large twist angle η, and the twist angle μ of each ball-end cutting edge 6a-6f meets the relation of $\eta-\mu \leq 7°$, so that a short portion of each second rake face 12a-12f enters each first rake face 11a-11f, securing high rigidity to each ball-end cutting edge 6a-6f.

As shown in FIG. 23, the center-lowered, inclined cutting edge 8a has an arcuate portion 8a1 curved rearward in a rotation direction, and a ball-end cutting edge extension 8a2. Of course, the ball-end cutting edge extension 8a2 may be omitted, and the arcuate portion 8a1 need not be entirely curved but may have a curve portion and a straight portion. This is also true in the other center-lowered, inclined cutting edges 8b-8f. Though not shown, each center-lowered, inclined cutting edge 8a-8f is inclined with an inclination angle α of 0.5-3° relative to a plane perpendicular to the rotation axis, such that the rotation center point O is positioned on the rear side of the connecting point P1-P6 of each ball-end cutting edge 6a-6f in a rotation axis direction.

As shown in FIG. 23, a ratio of the radial length X1 of the arcuate portion 8a1 to the radial length X of the center-lowered, inclined cutting edge 8a is preferably 20-100%, more preferably 30-100%, most preferably 60-95%, as in the first embodiment. The circumferential width W1 of the flank 10a at the connecting point P1 of the center-lowered, inclined cutting edge 8a and the ball-end cutting edge 6a is preferably 20-80%, more preferably 30-70%, of the maximum circumferential width of the flank 9a of the ball-end cutting edge, as in the first embodiment. The radial length X (radial distance between the outer end P1 of the ball-end cutting edge 6a and the rotation center point O) of the center-lowered, inclined cutting edges 8a is preferably 1.25-3.75%, more preferably 1.5-3.5%, of the diameter D of the cutting edge portion 3, as in the first embodiment. This is of course true in the other center-lowered, inclined cutting edges 8b-8f. In the six-flute ball end mill, the center angle β of an arcuate portion of each center-lowered, inclined cutting edge 8a-8f is preferably 20-70°, more preferably 30-60°, most preferably 40-48°, as in the first embodiment.

The I-I cross section, the II-II cross section, the cross section and the IV-IV cross section perpendicular to the rotation axis at positions distant by 0.10D, 0.25D, 0.40D and 0.70D in a rotation axis direction from the connecting point K of each center-lowered, inclined cutting edge and each ball-end cutting edge are shown in FIGS. 24(a), 24(b), 24(c) and 24(d), respectively.

Figure 24A:
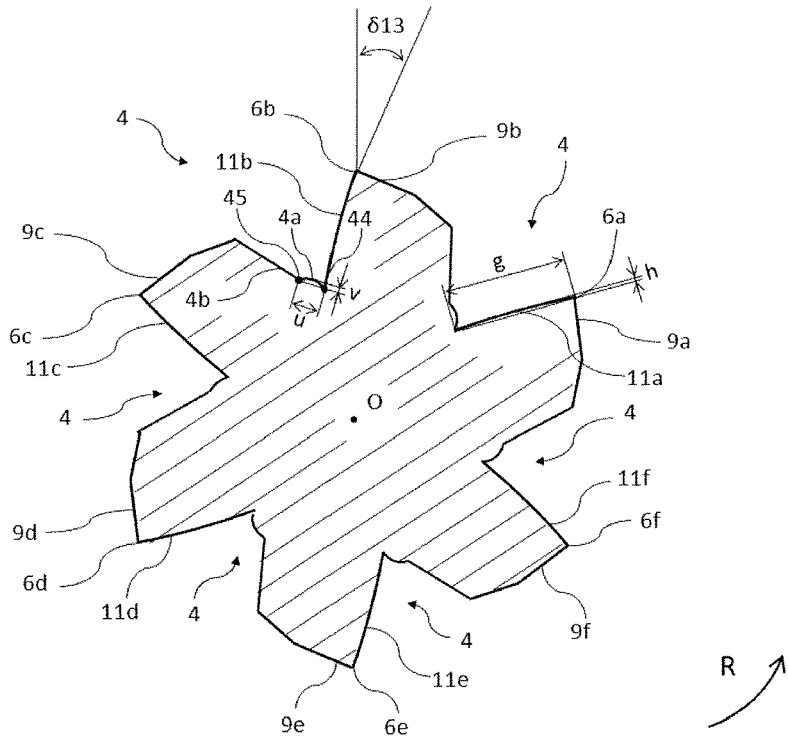
FIG. 24(a) is an enlarged view showing a I-I cross section of the six-flute ball end mill of FIG. 21, which is perpendicular to the rotation axis at a position distant by 0.10D in a rotation axis direction from the connecting point of the center-lowered, inclined cutting edge and the ball-end cutting edge.
Figure 24B:
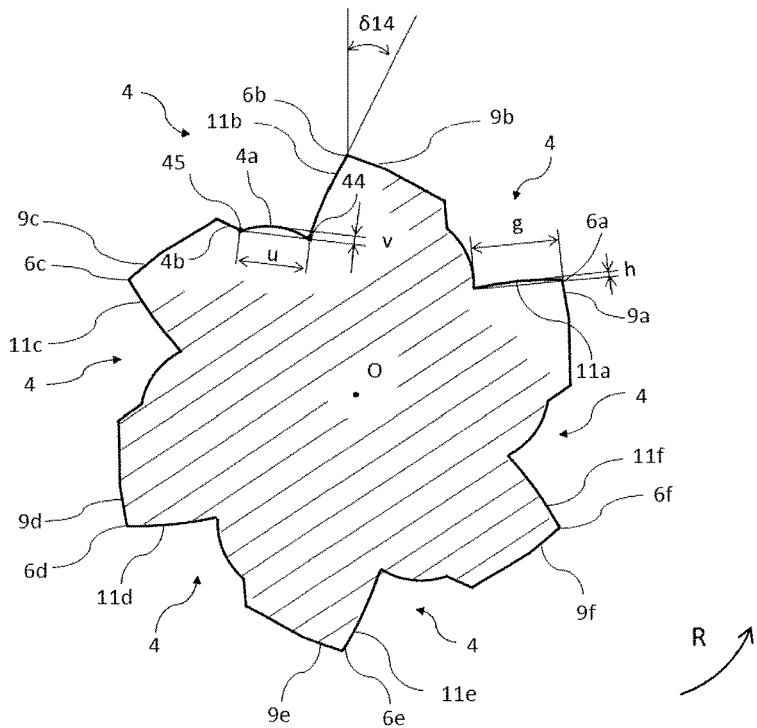
FIG. 24(b) is an enlarged view showing a II-II cross section of the six-flute ball end mill of FIG. 21, which is perpendicular to the rotation axis at a position distant by 0.25D in a rotation axis direction from the connecting point of the center-lowered, inclined cutting edge and the ball-end cutting edge.

As is clear from the I-I cross section (distant from the connecting point K by 0.10D) shown in FIG. 24(a) and the II-II cross section (distant from the connecting point K by 0.25D) shown in FIG. 24(b), each chip-discharging groove 4 is constituted by a rake face 11b of a ball-end cutting edge 6b, a convex groove bottom surface 4a, and a groove wall surface 4b extending from a flank 9c of a ball-end cutting edge 6c positioned forward in a rotation direction. Though the groove bottom surface 4a is entirely convexly curved in FIGS. 24(a) and 24(b), preferably 50% or more of the length u of the groove bottom surface 4a is occupied by a convex surface to obtain the effects of the present invention. Other portions of the groove bottom surface 4a than the convex surface may be straight. The groove bottom surface 4a spreads from its boundary 44 with the rake face 11b of the ball-end cutting edge to its boundary 45 with the groove wall surface 4b.

As shown in FIGS. 24(a) and 24(b), a rake face 11a-11f of each ball-end cutting edge 6a-6f is preferably a curved surface convexly projecting forward in a rotation direction. The curvature h/g of a convexly curved surface in each rake face 11a-11f is preferably 1-10%, more preferably 1-8%. The curvature v/u of a convex surface of a groove bottom surface 4a of each chip-discharging groove 4 between the ball-end cutting edges is also preferably 5-40%, more preferably 8-35%, to provide each cutting edge with sufficient rigidity and strength. When the convex surface has a curvature of less than 5%, the ball portion 3a has insufficient rigidity and strength. When the curvature is more than 40%, a chip pocket is too small. The radial rake angle [only δ13 is shown in FIG. 24(a), and only δ14 is shown in FIG. 24(b)] of each ball-end cutting edge is −37° to −11°, preferably −32° to −16°. When the radial rake angle of each ball-end cutting edge is less than −37°, the ball-end cutting edge has insufficient cutting performance. When the radial rake angle is more than −11°, the ball-end cutting edge has low rigidity and strength. In both cases, the stable cutting of a high-hardness material is difficult.

Figure 24C:
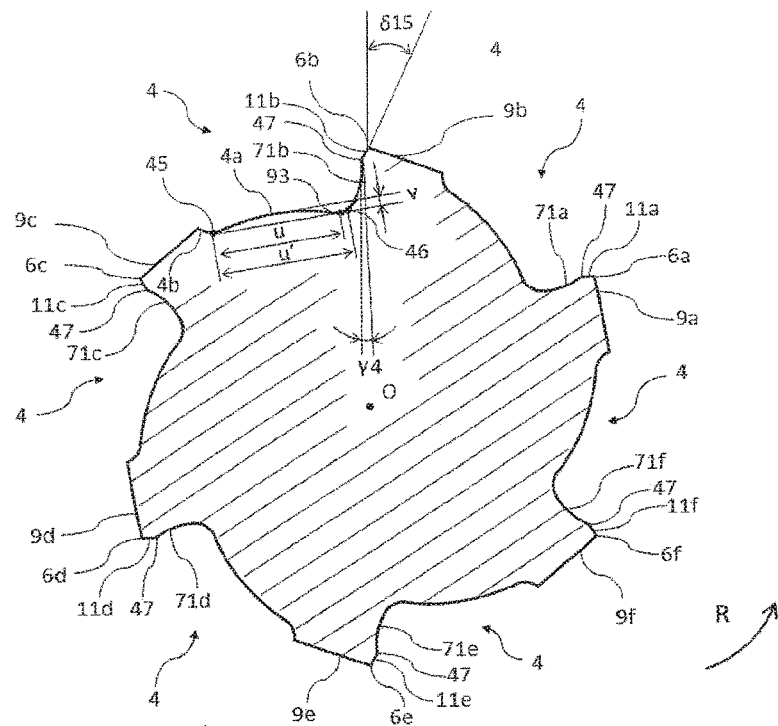
FIG. 24(c) is an enlarged view showing a cross section of the six-flute ball end mill of FIG. 21, which is perpendicular to the rotation axis at a position distant by 0.40D in a rotation axis direction from the connecting point of the center-lowered, inclined cutting edge and the ball-end cutting edge.

As is clear from the cross section (distant from the connecting point K by 0.40D) shown in FIG. 24(c), in a connecting region of each ball-end cutting edge and each peripheral cutting edge, a rake face of a ball-end cutting edge 6b is constituted by a first short rake face 11b extending from the ball-end cutting edge 6b, and a second concave rake face 71b connected to the first rake face 11b at the boundary 47, like the four-flute ball end mill. Each chip-discharging groove 4 is constituted by first and second rake faces 11b, 71b, a convex groove bottom surface 4a, and a groove wall surface 4b extending from the flank 9c of the ball-end cutting edge 6c positioned forward in a rotation direction. The groove bottom surface 4a spreads from its boundary 46 with the second rake face 71b to its boundary 45 with the groove wall surface 4b. The length u' of the groove bottom surface 4a in FIG. 24(c) is slightly longer than the length u of the convex surface in FIG. 24(b). To obtain the effects of the present invention, preferably 50% or more of the length u' of the groove bottom surface 4a is occupied by a convex surface. Other portions of the groove bottom surface 4a than the convex surface may be straight. The curvature v/u of a convex surface in each groove bottom surface is also preferably 5-40%, more preferably 8-35%, such that each cutting edge has sufficient rigidity and strength. The radial rake angle [only δ15 is shown in FIG. 24(c)] of each ball-end cutting edge is also −37° to −11°, preferably −32° to −16°.

In the six-flute ball end mill, too, to provide each cutting edge with increased rigidity and strength, from the I-I cross section distant by 0.10D in a rotation axis direction from the connecting point of each center-lowered, inclined cutting edge and each ball-end cutting edge to the cross section distant by 0.40D via the II-II cross section distant by 0.25D, (a) a radial rake angle of each ball-end cutting edge preferably gradually increases in a range from −37° to −11°; and (b) the curvature of a convex bottom surface portion of each chip-discharging groove between the ball-end cutting edges preferably gradually increases in a range from 5% to 40%. The curvature of a convex bottom surface portion of a chip-discharging groove of a peripheral cutting edge is preferably larger than the curvature of a convex bottom surface portion of a chip-discharging groove of a ball-end cutting edge. The radial rake angle [only γ4 is shown in FIG. 24(c)] of each second rake face 71b is preferably 0-8°, more preferably 2-7°.

Figure 24D:
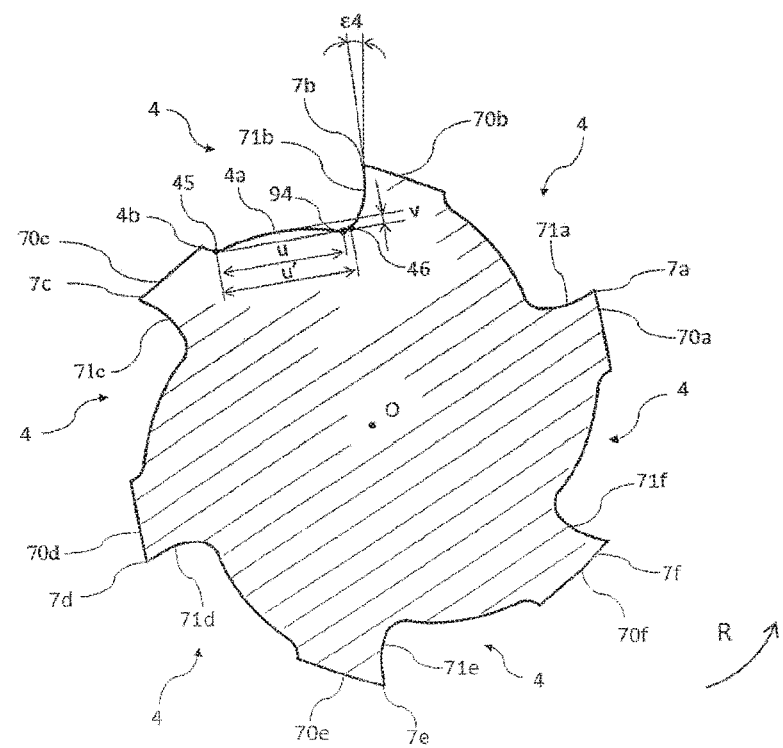
FIG. 24(d) is an enlarged view showing a IV-IV cross section of the six-flute ball end mill of FIG. 21, which is perpendicular to the rotation axis at a position distant by 0.70D in a rotation axis direction from the connecting point of the center-lowered, inclined cutting edge and the ball-end cutting edge.
Figure 25:
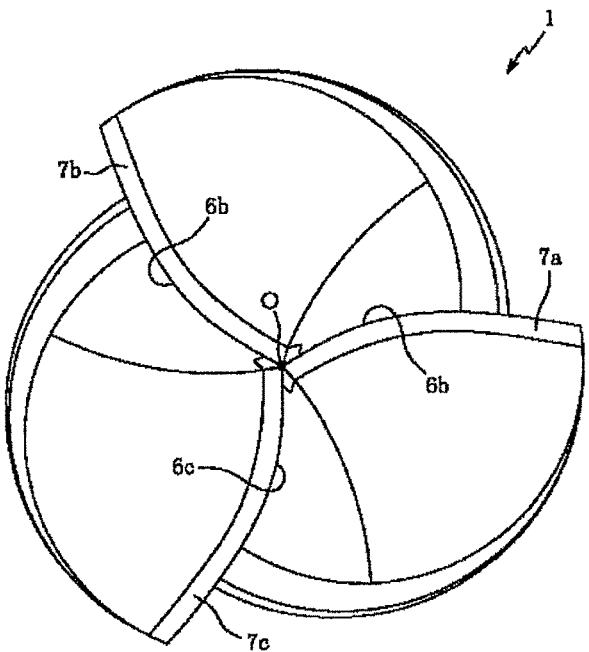
FIG. 25 is a front view showing the multi-flute ball end mill of JP 2002-187011 A.
Figure 26:
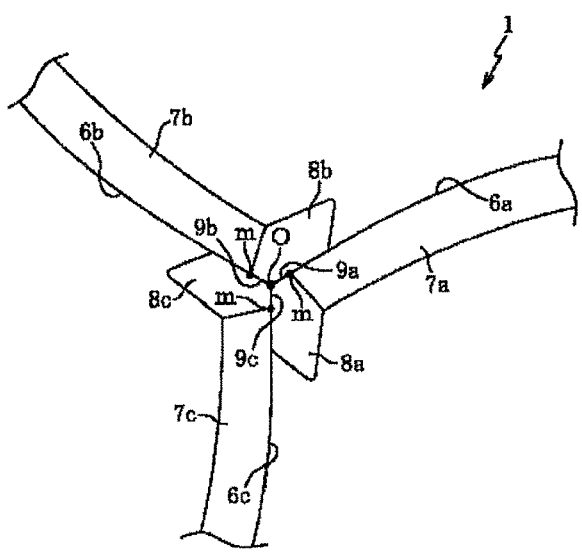
FIG. 26 is partial, enlarged front view of FIG. 25.

As is clear from the IV-IV cross section (distant from the connecting point K by 0.70D) shown in FIG. 24(d), each chip-discharging groove 4 in a peripheral cutting edge region is constituted by a rake face 71b of a peripheral cutting edge 7b, a convex groove bottom surface 4a, and a groove wall surface 4b extending from the flank 70c of the peripheral cutting edge positioned forward in a rotation direction. The radial rake angle [only ε4 is shown in FIG. 24(d)] of each peripheral cutting edge is 2-8°, preferably 4-7°. When the radial rake angle of each peripheral cutting edge is less than 2°, the peripheral cutting edge has insufficient cutting performance. When the radial rake angle is more than 8°, the peripheral cutting edge has low rigidity and strength. In both cases, the stable cutting of a high-hardness material is difficult.

Effect of the Invention

In the multi-flute ball end mill of the present invention, (a) each cutting edge is constituted by a peripheral cutting edge having a twist angle η of 35-45°, and the twist angle μ of a ball-end cutting edge at the outermost peripheral point meets the relation of η−μ≤7° to the twist angle η, such that the ball-end cutting edge is smoothly connected to the peripheral cutting edge; (b) the ball-end cutting edge has a radial rake angle of −37° to −11°, and the peripheral cutting edge has a radial rake angle of 2-8°, in a range from 0.1D to 0.4D from the connecting point of each center-lowered, inclined cutting edge and each ball-end cutting edge, wherein D is a diameter of the cutting edge portion; and (c) each center-lowered, inclined cutting edge integrally extends from a tip end of each ball-end cutting edge to the rotation center point in a tip end portion of the ball portion near the rotation center point. Accordingly, chipping and breakage can be sufficiently suppressed in the ball-end cutting edges and the peripheral cutting edges, and a cutting load near the rotation center point O can be reduced to effectively discharge chips, even in high-feed roughing of a high-hardness, difficult-to-cut material.

DESCRIPTION OF REFERENCE NUMERALS 1, 30: Four-flute ball end mill
2: Shank portion
3: Cutting edge portion
3a: Ball portion
4: Chip-discharging groove
4a: Groove bottom surface
4b: Groove wall surface
5a, 5b, 5c, 5d: Cutting edge
6a, 6b, 6c, 6d, 6e, 6f: Ball-end cutting edge
7a, 7b, 7c, 7d, 7e, 7f: Peripheral cutting edge
8a, 8b, 8c, 8d, 8e, 8f: Center-lowered, inclined cutting edge
8a1, 8b1, 8c1, 8d1: Arcuate portion
8a2, 8b2, 8c2, 8d2: Ball-end cutting edge extension
9a, 9b, 9c, 9d, 9e, 9f: Flank of ball-end cutting edge
10a, 10b, 10c, 10d, 10e, 10f: Flank of center-lowered, inclined cutting edge
11a, 11b, 11 c, 11d: Rake face of ball-end cutting edge
12a, 12b, 12c, 12d: Rake face of peripheral cutting edge
13a, 13b, 13c, 13d: Flank of peripheral cutting edge
14: Recess
15a, 15b, 15c, 15d: Boundary line
16: Square projection
17a, 17b, 17c, 17d, 17e, 17f: Gash
20, 21, 22, 23, 44, 45, 46, 47, 49: Boundary
26, 27, 28, 29: Outer end of ball-end cutting edge
40: Three-flute ball end mill
50: Five-flute ball end mill
60: Six-flute ball end mill
71a, 71b, 71c, 71d: Second rake face
Ax: Rotation axis
C: Region near rotation center point
D: Diameter of cutting edge portion
L1, L2, L3: Straight line
O: Rotation center point
P1, P2, P3, P4, P5, P6: Connecting point of center-lowered, inclined cutting edge and ball-end cutting edge
K1, K2, K3, K4, K5, K6: Outer end of arcuate portion of center-lowered, inclined cutting edge
Q1: Point at which straight line connecting both ends of arcuate portion of center-lowered, inclined cutting edge crosses perpendicular line extending from apex of arcuate portion of center-lowered, inclined cutting edge
Q2: Apex of arcuate portion of center-lowered, inclined cutting edge
R: Rotation direction of multi-flute ball end mill
T: Width
g, u: Length of convexly curved (or convex) surface
u': Length of groove bottom surface
h, v: Height of convexly curved (or convex) surface
X: Radial length of center-lowered, inclined cutting edge
X1: Radial length of arcuate portion of center-lowered, inclined cutting edge
X2: Radial length of ball-end cutting edge extension W1: Circumferential width of flank of center-lowered, inclined cutting edge
W2: Maximum circumferential width of flank of ball-end cutting edge
$\alpha$: Inclination angle of center-lowered, inclined cutting edge
$\beta$: Center angle of arcuate portion of center-lowered, inclined cutting edge
$\delta 1$-$\delta 15$: Radial rake angle of ball-end cutting edge
$\gamma 1$-$\gamma 4$: Radial rake angle of second ball-end cutting edge
$\eta$: Twist angle of peripheral cutting edge
$\mu$: Twist angle of ball-end cutting edge at outermost peripheral point
$\lambda 1$-$\lambda 3$: Curve angle
$\varepsilon 1$-$\varepsilon 4$: Radial rake angle of peripheral cutting edge

What is claimed is:

1. A multi-flute ball end mill comprising a shank portion rotating around a rotation axis, a cutting edge portion having a ball-shaped tip portion, and 3 or more cutting edges formed in said cutting edge portion;
    each cutting edge being constituted by a peripheral cutting edge having a twist angle $\eta$ of 35-45°, and a ball-end cutting edge having a twist angle $\mu$ at the outermost peripheral point, said twist angle $\eta$ and said twist angle $\mu$ meeting the relation of $\eta-\mu \leq 7°$, such that said ball-end cutting edge is smoothly connected to said peripheral cutting edge;
    said ball-end cutting edge having a radial rake angle of −37° to −11°, and said peripheral cutting edge having a radial rake angle of 2-8°, in a range from 0.1D to 0.4D from a connecting point of each center-lowered, inclined cutting edge and each ball-end cutting edge, wherein D is a diameter of said cutting edge portion;
    said center-lowered, inclined cutting edge integrally extending from a tip end of each ball-end cutting edge to a rotation center point, in a tip end portion of said ball portion near said rotation center point; and
    a second concave rake face having a positive rake angle, which corresponds to a rake face of each peripheral cutting edge, entering a center portion of a first rake face having a negative rake angle, which corresponds to a rake face of each ball-end cutting edge, in a region of each ball-end cutting edge near a boundary of said ball-end cutting edge and said peripheral cutting edge, a ratio of said second rake face to said first rake face gradually increasing as nearing said boundary, with said second rake face reaching 100% at said boundary.

2. The multi-flute ball end mill according to claim 1, wherein each center-lowered, inclined cutting edge has at least an arcuate portion projecting rearward in a rotation direction, said arcuate portion having a curvature (ratio of the length of a perpendicular line extending from an apex of said arcuate portion to a line connecting both ends of said arcuate portion to the length of said line connecting both ends of said arcuate portion) of 5-40%; and wherein each center-lowered, inclined cutting edge is inclined with an inclination angle $\alpha$ of 0.5-3° relative to a plane perpendicular to said rotation axis, such that said rotation center point is positioned on the rear side of a connecting point of each center-lowered, inclined cutting edge and each ball-end cutting edge in a rotation axis direction.

3. The multi-flute ball end mill according to claim 1, wherein a boundary of said first rake face and said second rake face is in a curved shape projecting toward a tip end of each ball-end cutting edge.

4. The multi-flute ball end mill according to claim 1, wherein a chip-discharging groove between said ball-end cutting edges has a convex bottom surface; and wherein the curvature of said convex bottom surface (ratio of the length of a perpendicular line extending from an apex of said convex bottom surface to a line connecting both ends of said convex bottom surface to the length of said line connecting both ends of said convex bottom surface) is 5-40%.

5. The multi-flute ball end mill according to claim 4, wherein 50% or more of a bottom surface of said chip-discharging groove is occupied by said convex surface portion.

6. The multi-flute ball end mill according to claim 1, wherein the percentage of the radial length of said arcuate portion in each center-lowered, inclined cutting edge is 20-100%; wherein the circumferential width of a flank of each center-lowered, inclined cutting edge at a connecting point of the center-lowered, inclined cutting edge and the ball-end cutting edge in each cutting edge is 20-80% of the maximum circumferential width of a flank of each ball-end cutting edge; and wherein the radial length X of each center-lowered, inclined cutting edge (radial distance between an outer end of said ball-end cutting edge and said rotation center point) is 1.25-3.75% of the diameter D of said cutting edge portion.

7. The multi-flute ball end mill according to claim 1, wherein said ball-end cutting edges are unevenly arranged circumferentially around said rotation axis.

8. A multi-flute ball end mill comprising a shank portion rotating around a rotation axis, a cutting edge portion having a ball-shaped tip portion, and 3 or more cutting edges formed in said cutting edge portion;
   each cutting edge being constituted by a peripheral cutting edge having a twist angle η of 35-45°, and a ball-end cutting edge having a twist angle μ at the outermost peripheral point, said twist angle η and said twist angle μ meeting the relation of η−μ≤7°, such that said ball-end cutting edge is smoothly connected to said peripheral cutting edge;
   said ball-end cutting edge having a radial rake angle of −37° to −11°, and said peripheral cutting edge having a radial rake angle of 2-8°, in a range from 0.1D to 0.4D from a connecting point of each center-lowered, inclined cutting edge and each ball-end cutting edge, wherein D is a diameter of said cutting edge portion;
   said center-lowered, inclined cutting edge integrally extending from a tip end of each ball-end cutting edge to a rotation center point, in a tip end portion of said ball portion near said rotation center point; and
   a rake face of each ball-end cutting edge being a curved surface convexly projecting forward in a rotation direction, the curvature of said convexly curved surface (ratio of the length of a perpendicular line extending from an apex of said convexly curved surface to a line connecting both ends of said convexly curved surface to the length of said line connecting both ends of said convexly curved surface) being 1-10%.

9. The multi-flute ball end mill according to claim 8, wherein each center-lowered, inclined cutting edge has at least an arcuate portion projecting rearward in a rotation direction, said arcuate portion having a curvature (ratio of the length of a perpendicular line extending from an apex said arcuate portion to a line connecting both ends of said arcuate portion to the length of said line connecting both ends of said arcuate portion) of 5-40%; and wherein each center-lowered, inclined cutting edge is inclined with an inclination angle α of 0.5-3° relative to a plane perpendicular to said rotation axis, such that said rotation center point is positioned on the rear side of a connecting point of each center-lowered, inclined cutting edge and each ball-end cutting edge in a rotation axis direction.

10. The multi-flute ball end mill according to claim 8, wherein a chip-discharging groove between said ball-end cutting edges has a convex bottom surface; and wherein the curvature of said convex bottom surface (ratio of the length of a perpendicular line extending from an apex of said convex bottom surface to a line connecting both ends of said convex bottom surface to the length of said line connecting both ends of said convex bottom surface) is 5-40%.

11. The multi-flute ball end mill according to claim 10, wherein 50% or more of a bottom surface of said chip-discharging groove is occupied by said convex surface portion.

12. The multi-flute ball end mill according to claim 8, wherein the percentage of the radial length of said arcuate portion in each center-lowered, inclined cutting edge is 20-100%; wherein the circumferential width of a flank of each center-lowered, inclined cutting edge at a connecting point of the center-lowered, inclined cutting edge and the ball-end cutting edge in each cutting edge is 20-80% of the maximum circumferential width of a flank of each ball-end cutting edge; and wherein the radial length X of each center-lowered, inclined cutting edge (radial distance between an outer end of said ball-end cutting edge and said rotation center point) is 1.25-3.75% of the diameter D of said cutting edge portion.

13. The multi-flute ball end mill according to claim 8, wherein said ball-end cutting edges are unevenly arranged circumferentially around said rotation axis.

* * * * *